(12) United States Patent
Huang et al.

(10) Patent No.: US 11,984,958 B2
(45) Date of Patent: May 14, 2024

(54) CHANNEL STATE INFORMATION REPORTING TECHNIQUES FOR FULL-DUPLEX USER EQUIPMENT

(71) Applicant: Qualcomm Incorporated, San Diego, CA (US)

(72) Inventors: Min Huang, Beijing (CN); Qiaoyu Li, Beijing (CN); Liangming Wu, Beijing (CN); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/620,974

(22) PCT Filed: Jun. 10, 2020

(86) PCT No.: PCT/CN2020/095292
§ 371 (c)(1),
(2) Date: Dec. 20, 2021

(87) PCT Pub. No.: WO2020/253585
PCT Pub. Date: Dec. 24, 2020

(65) Prior Publication Data
US 2022/0329308 A1 Oct. 13, 2022

(30) Foreign Application Priority Data
Jun. 21, 2019 (WO) ................ PCT/CN2019/092236

(51) Int. Cl.
*H04L 5/00* (2006.01)
*H04B 7/06* (2006.01)
(Continued)

(52) U.S. Cl.
CPC ......... *H04B 7/0639* (2013.01); *H04B 7/0626* (2013.01); *H04L 5/0051* (2013.01); *H04L 5/1461* (2013.01); *H04W 72/23* (2023.01)

(58) Field of Classification Search
None
See application file for complete search history.

(56) References Cited

U.S. PATENT DOCUMENTS

2014/0064109 A1 3/2014 Krishnamurthy
2017/0054544 A1* 2/2017 Kazmi ...................... H04L 5/14
(Continued)

FOREIGN PATENT DOCUMENTS

CN 104782065 A 7/2015
CN 106209151 A 12/2016
(Continued)

OTHER PUBLICATIONS

Ericsson: "Discussion on eMTC Demodulation Requirement for FDD," 3GPP TSG-RAN WG4 Meeting #78, R4-160348, Feb. 15-19, 2016 (Feb. 19, 2016) section 2, 2 pages.
(Continued)

*Primary Examiner* — Anh Vu H Ly
(74) *Attorney, Agent, or Firm* — Holland & Hart / Qualcomm

(57) ABSTRACT

Methods, systems, and devices for wireless communications are described for a user equipment (UE) operating in a full-duplex mode to report of channel state information based on an estimate of self-interference associated with concurrent uplink and downlink transmissions using at least partially overlapping frequency resources. A base station may transmit downlink reference signals to the UE for measurement and generation of the channel state information, and the base station may use the channel state information reported by the UE to schedule the simultaneous (Continued)

transmission and reception such that the self-interference from full-duplex mode operations is mitigated.

30 Claims, 22 Drawing Sheets

(51) Int. Cl.
*H04L 5/14* (2006.01)
*H04W 72/23* (2023.01)

(56) References Cited

U.S. PATENT DOCUMENTS

| | | |
|---|---|---|
| 2017/0238294 A1 | 8/2017 | Lim et al. |
| 2018/0375555 A1 | 12/2018 | Noh et al. |
| 2019/0174466 A1* | 6/2019 | Zhang ............... H04L 5/0057 |
| 2022/0077911 A1* | 3/2022 | Sergeev ............ H04B 7/0626 |
| 2022/0182120 A1* | 6/2022 | Sergeev ............ H04B 7/063 |
| 2022/0247467 A1* | 8/2022 | Huang ............... H04B 7/0626 |

FOREIGN PATENT DOCUMENTS

| | | | |
|---|---|---|---|
| CN | 108370266 A | 8/2018 | |
| EP | 3480968 A1 | 5/2019 | |
| WO | WO-2018031727 A1 * | 2/2018 | ........... H04B 17/373 |
| WO | WO-2018231812 A1 * | 12/2018 | ........... H04B 7/0626 |
| WO | WO-2020238632 A1 | 12/2020 | |

OTHER PUBLICATIONS

International Search Report and Written Opinion—PCT/CN2019/092236—ISA/EPO—dated Mar. 23, 2020 (193252WO1).
International Search Report and Written Opinion—PCT/CN2020/095292—ISA/EPO—dated Aug. 28, 2020 (193252WO2).
Supplementary Partial European Search Report—EP20827867—Search Authority—Munich—dated May 12, 2023 (193252EP).
Supplementary European Search Report—EP20827867—Search Authority—Munich—dated Aug. 14, 2023 (193252EP).

* cited by examiner

CHANNEL STATE INFORMATION REPORTING TECHNIQUES FOR FULL-DUPLEX USER EQUIPMENT

CROSS REFERENCE TO RELATED APPLICATIONS

The present Application is a 371 national stage filing of International PCT Application No. PCT/CN2020/095292 by Huang et al., entitled "CHANNEL STATE INFORMATION REPORTING TECHNIQUES FOR FULL-DUPLEX USER EQUIPMENT," filed Jun. 10, 2020; and claims priority to International Patent Application No. PCT/CN2019/092236 by Huang et al., entitled "CHANNEL STATE INFORMATION REPORTING TECHNIQUES FOR FULL-DUPLEX USER EQUIPMENT," filed Jun. 21, 2019, each of which is assigned to the assignee hereof, and each of which is expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be capable of both transmitting uplink traffic to a base station and receiving downlink traffic from a base station (e.g., from a same or different base station, using different antennas from a same or different base station, etc.) simultaneously using time and frequency resources that are at least partially overlapping. This capability of communicating in two directions at a same time and at a same frequency may be referred to as a full-duplex capability of the UE. When operating in a full-duplex mode, the concurrent uplink and downlink transmissions of the UE may result in a self-interference at the UE, which can impact downlink traffic, uplink traffic, or both. Efficient techniques for mitigating such self-interference may thus be desired to help enhance system performance and reliability.

SUMMARY

The described techniques relate to improved methods, systems, devices, and apparatuses that support channel state information reporting techniques for full-duplex user equipment. In various aspects, self-interference at a full-duplex UE may be mitigated through determination of precoding information that is used for uplink and downlink transmissions. In some cases, a UE may receive an indication from a base station of an uplink precoding matrix that is to be applied for uplink transmissions (e.g., a transmit precoding matrix indicator (TPMI) or sounding reference signal (SRS) resource indicator (SRI)), and determine a channel state information (CSI) report (e.g., based on a reference signal received from the base station) that is based on an estimate of self-interference from a concurrent uplink transmission that uses the indicated precoding. A downlink precoding matrix for downlink transmissions from the base station may be determined based on the CSI report. Full-duplex communications using the uplink and downlink precoding matrices may thus mitigate self-interference and enhance throughput of the full-duplex communications.

Additionally or alternatively, a UE may receive a downlink reference signal (e.g., a CSI reference signal (CSI-RS)) and determine a downlink precoding matrix. Based on the downlink precoding matrix, the UE may determine a subset of uplink precoding matrices based on self-interference estimates associated with uplink transmissions using the subset of uplink precoding matrices and downlink transmissions that use the downlink precoding matrix. The UE may transmit a CSI report and indicate the determined downlink precoding matrix and the subset of uplink precoding matrices. The UE may transmit an uplink reference signal, and the base station may select one of the subset of uplink precoding matrices for use in full-duplex communications with the UE.

A method of wireless communications at a UE is described. The method may include receiving, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determining, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmitting the channel state information report to the base station.

An apparatus for wireless communications at a UE is described. The apparatus may include a processor, memory coupled with the processor, and instructions stored in the memory. The instructions may be executable by the processor to cause the apparatus to receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmit the channel state information report to the base station.

Another apparatus for wireless communications at a UE is described. The apparatus may include means for receiving, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determining, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmitting the channel state information report to the base station.

A non-transitory computer-readable medium storing code for wireless communications at a UE is described. The code may include instructions executable by a processor to receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmit the channel state information report to the base station.

Some examples of the method, apparatuses, and non-transitory computer-readable medium described herein may further include operations, features, means, or instructions for receiving, from the base station, downlink grant information and uplink grant information for downlink communications and uplink communications that at least partially overlap in time and frequency, where the downlink grant information indicates a downlink transport format that may be based on the channel state information report, and communicating with the base station in a full duplex mode with concurrent uplink and downlink communications that at least partially overlap in frequency based on the downlink grant information and the uplink grant information.

Some examples of the method, apparatuses, and non-transitory computer-readable medium described herein may further include operations, features, means, or instructions for transmitting a precoded uplink reference signal to the base station, and where the uplink precoding matrix indicator corresponds to a precoding matrix applied to the precoded uplink reference signal.

In some examples of the method, apparatuses, and non-transitory computer-readable medium described herein, the transmitting the precoded uplink reference signal may include operations, features, means, or instructions for transmitting a set of precoded uplink reference signals using a set of different reference signal resources, where each reference signal resource may be associated with a different uplink precoding matrix, and where the uplink precoding matrix indicator from the base station identifies a selected reference signal resource. In some examples of the method, apparatuses, and non-transitory computer-readable medium described herein, the downlink reference signal may be a channel state information reference signal (CSI-RS) and the uplink reference signal may be a SRS.

In some examples of the method, apparatuses, and non-transitory computer-readable medium described herein, the uplink precoding matrix indicator from the base station identifies an index of an uplink precoding matrix that belongs to a set of preconfigured uplink precoding matrixes.

In some examples of the method, apparatuses, and non-transitory computer-readable medium described herein, the uplink precoding matrix indicator from the base station includes a set of uplink precoding matrix indicator values that may be associated with one or more time slots, one or more frequency bands, or combinations thereof. In some examples of the method, apparatuses, and non-transitory computer-readable medium described herein, the uplink precoding matrix indicator may be provided in a channel state information report configuration. In some examples of the method, apparatuses, and non-transitory computer-readable medium described herein, the channel state information report configuration may be an aperiodic channel state information report configuration provided in a medium access control (MAC) control element or downlink control information.

In some examples of the method, apparatuses, and non-transitory computer-readable medium described herein, the determining the channel state information report may include operations, features, means, or instructions for measuring a downlink channel status of a first set of receive antennas for the downlink reference signal to generate a downlink signal matrix, adding the self-interference estimate to the downlink signal matrix to determine a full-duplex mode downlink signal matrix, and generating the channel state information report based on the full-duplex mode downlink signal matrix.

In some examples of the method, apparatuses, and non-transitory computer-readable medium described herein, the adding the self-interference estimate may include operations, features, means, or instructions for identifying a self-interference based on the first set of receive antennas, a second set of transmit antennas, and the uplink precoding matrix indicator, mitigating the self-interference over the downlink signal matrix based on the identified self-interference, and determining a full-duplex mode downlink signal matrix based at least in part on the mitigated self-interference.

In some examples of the method, apparatuses, and non-transitory computer-readable medium described herein, the mitigating the self-interference may include operations, features, means, or instructions for calculating a self-interference matrix based on the first set of receive antennas, a second set of transmit antennas, and the uplink precoding matrix indicator, and projecting the downlink signal matrix into a null subspace of the self-interference matrix or whitening a composite interference-plus-noise matrix that corresponds to an added self-interference matrix and the downlink signal matrix.

In some examples of the method, apparatuses, and non-transitory computer-readable medium described herein, the self-interference may be identified from a set of predetermined self-interference matrices that may be associated with different combinations of the first set of receive antennas, the second set of transmit antennas, and uplink precoding matrix indicators. In some examples of the method, apparatuses, and non-transitory computer-readable medium described herein, the first set of receive antennas and the second set of transmit antennas correspond to a same set of antennas at the UE, or correspond to different sets of antennas at the UE.

A method of wireless communications at a UE is described. The method may include determining, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, selecting, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmitting, to the base station, a channel state information report indicating at least the downlink precoding matrix indicator and the subset of uplink precoding matrix indicators, and receiving, from the base station, an indication of which of the subset of uplink precoding matrix indicators are to be used for the uplink transmissions.

An apparatus for wireless communications at a UE is described. The apparatus may include a processor, memory coupled with the processor, and instructions stored in the memory. The instructions may be executable by the processor to cause the apparatus to determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmit, to the base station, a channel state information report indicating at least the downlink precoding matrix indicator and the subset of uplink precoding matrix indicators, and receive, from the base station, an indication of which of the subset of uplink precoding matrix indicators are to be used for the uplink transmissions.

Another apparatus for wireless communications at a UE is described. The apparatus may include means for determining, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, selecting, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmitting, to the base station, a channel state information report indicating at least the downlink precoding matrix indicator and the subset of uplink precoding matrix indicators, and receiving, from the base station, an indication of which of the subset of uplink precoding matrix indicators are to be used for the uplink transmissions.

A non-transitory computer-readable medium storing code for wireless communications at a UE is described. The code may include instructions executable by a processor to determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmit, to the base station, a channel state information report indicating at least the downlink precoding matrix indicator and the subset of uplink precoding matrix indicators, and receive, from the base station, an indication of which of the subset of uplink precoding matrix indicators are to be used for the uplink transmissions.

In some examples of the method, apparatuses, and non-transitory computer-readable medium described herein, the uplink precoding matrix indicator from the base station identifies an index of an uplink precoding matrix that belongs to a set of preconfigured uplink precoding matrixes. Some examples of the method, apparatuses, and non-transitory computer-readable medium described herein may further include operations, features, means, or instructions for transmitting a precoded uplink reference signal to the base station, and where the uplink precoding matrix indicator corresponds to a precoding matrix applied to the uplink reference signal. In some examples of the method, apparatuses, and non-transitory computer-readable medium described herein, the subset of uplink precoding matrix indicators correspond to a preferable or unpreferable subset of the set of available uplink precoding matrix indicators based on the one or more measurements of the downlink reference signal and the determined downlink precoding matrix indicator.

Some examples of the method, apparatuses, and non-transitory computer-readable medium described herein may further include operations, features, means, or instructions for receiving, from the base station, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report, and communicating with the base station in a full duplex mode with concurrent uplink and downlink communications that at least partially overlap in frequency based on the downlink grant information and the uplink grant information.

In some examples of the method, apparatuses, and non-transitory computer-readable medium described herein, the subset of uplink precoding matrix indicators include a plurality of pairs of self-interference estimate values and precoding matrix indicators and wherein, for each pair in the plurality of pairs, the self-interference estimate value corresponds to the associated precoding matrix indicator value. In some cases, the set of uplink precoding matrix indicators is sorted according respective self-interference estimates, and the subset of uplink precoding matrix indicators includes uplink precoding matrix indicators having self-interference estimates that are below a threshold value or includes a configured number of uplink precoding matrix indicators that have the lowest self-interference estimates. In some cases, each pair of the plurality of pairs of self-interference estimate values and precoding matrix indicators is transmitted in a separate channel state information report. In some cases, each pair of the plurality of pairs of self-interference estimate values and precoding matrix indicators is indicated in a single channel state information report that includes an indication of each precoding matrix indication and associated self-interference value that is quantized in a differential manner relative to a first reported self-interference value.

In some examples of the method, apparatuses, and non-transitory computer-readable medium described herein, the selecting may include operations, features, means, or instructions for measuring a downlink channel status of a first set of receive antennas for the downlink reference signal to generate a downlink signal matrix, estimating a first self-interference matrix based on a first uplink precoding matrix indicator that may be associated with a second set of transmit antennas, determining that a channel quality associated with the downlink signal matrix and the first self-interference matrix exceeds a threshold value, and determining one or more equivalent self-interference matrices to the first self-interference matrix, and where the subset of uplink precoding matrix indicators may be associated with the one or more equivalent self-interference matrices.

In some examples of the method, apparatuses, and non-transitory computer-readable medium described herein, the downlink precoding matrix indicator may be determined prior to the selecting the subset of uplink precoding matrix indicators. In some examples of the method, apparatuses, and non-transitory computer-readable medium described herein, the downlink precoding matrix indicator may be determined concurrently with the selecting the subset of uplink precoding matrix indicators. In some examples of the method, apparatuses, and non-transitory computer-readable medium described herein, the subset of uplink precoding matrix indicators may be provided in a codepoint or a bitmap. In some examples of the method, apparatuses, and non-transitory computer-readable medium described herein, the channel state information report further includes one or more of a rank indicator or a channel quality indicator. In some examples of the method, apparatuses, and non-transitory computer-readable medium described herein, the channel state information report may be a periodic, semi-persistent or aperiodic report.

In some examples of the method, apparatuses, and non-transitory computer-readable medium described herein, the indication of which of the subset of uplink precoding matrix indicators are to be used for the uplink transmissions may be determined based on a channel quality of an uplink reference signal transmitted to the base station. In some examples of the method, apparatuses, and non-transitory computer-readable medium described herein, the first set of receive antennas and the second set of transmit antennas correspond to a same set of antennas at the UE, or correspond to different sets of antennas at the UE.

A method of wireless communications at a base station is described. The method may include determining, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmitting, to the UE, the uplink precoding matrix indicator and a downlink reference signal, receiving, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determining a downlink transport format for the one or more downlink transmissions to be concurrently transmitted with the one or more uplink transmissions, based on the channel state information report.

An apparatus for wireless communications at a base station is described. The apparatus may include a processor, memory coupled with the processor, and instructions stored in the memory. The instructions may be executable by the processor to cause the apparatus to determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmit, to the UE, the uplink precoding matrix indicator and a downlink reference signal, receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determine a downlink transport format for the one or more downlink transmissions to be concurrently transmitted with the one or more uplink transmissions, based on the channel state information report.

Another apparatus for wireless communications at a base station is described. The apparatus may include means for determining, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmitting, to the UE, the uplink precoding matrix indicator and a downlink reference signal, receiving, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determining a downlink transport format for the one or more downlink transmissions to be concurrently transmitted with the one or more uplink transmissions, based on the channel state information report.

A non-transitory computer-readable medium storing code for wireless communications at a base station is described. The code may include instructions executable by a processor to determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmit, to the UE, the uplink precoding matrix indicator and a downlink reference signal, receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determine a downlink transport format for the one or more downlink transmissions to be concurrently transmitted with the one or more uplink transmissions, based on the channel state information report.

Some examples of the method, apparatuses, and non-transitory computer-readable medium described herein may further include operations, features, means, or instructions for transmitting, to the UE, downlink grant information and uplink grant information for downlink communications and uplink communications that at least partially overlap in time and frequency, where the downlink grant information indicates the downlink transport format, and communicating with the UE in a full duplex mode with concurrent uplink and downlink communications that at least partially overlap in frequency based on the downlink grant information and the uplink grant information.

In some examples of the method, apparatuses, and non-transitory computer-readable medium described herein, the uplink precoding matrix indicator corresponds to a precoding matrix applied to a precoded uplink reference signal received from the UE. Some examples of the method, apparatuses, and non-transitory computer-readable medium described herein may further include operations, features, means, or instructions for receiving, from the UE, a set of precoded uplink reference signals using a set of different reference signal resources, where each reference signal resource is associated with a different uplink precoding matrix, and where the uplink precoding matrix indicator identifies a selected reference signal resource.

In some examples of the method, apparatuses, and non-transitory computer-readable medium described herein, the determining the uplink precoding matrix indicator may include operations, features, means, or instructions for identifying a first precoded uplink reference signal of the set of precoded uplink reference signals that has a highest signal quality, and determining the reference signal resource associated with the first precoded uplink reference signal. In some examples of the method, apparatuses, and non-transitory computer-readable medium described herein, the downlink reference signal may be a channel state information reference signal (CSI-RS) and the uplink reference signal may be a SRS.

In some examples of the method, apparatuses, and non-transitory computer-readable medium described herein, the uplink precoding matrix indicator from the base station identifies an index of an uplink precoding matrix that belongs to a set of preconfigured uplink precoding matrixes. In some examples of the method, apparatuses, and non-transitory computer-readable medium described herein, the determining the uplink precoding matrix indicator may include operations, features, means, or instructions for deriving an uplink channel response matrix of the UE based on one or more measurements of the uplink reference signal, and selecting an index of an uplink precoding codeword that corresponds to the uplink channel response matrix, where the index is provided by the uplink precoding matrix indicator.

In some examples of the method, apparatuses, and non-transitory computer-readable medium described herein, the uplink precoding matrix indicator includes a set of uplink precoding matrix indicator values that may be associated with one or more time slots, one or more frequency bands, or combinations thereof. In some examples of the method, apparatuses, and non-transitory computer-readable medium described herein, the uplink precoding matrix indicator may be provided in a channel state information report configuration. In some examples of the method, apparatuses, and non-transitory computer-readable medium described herein, the channel state information report configuration may be an aperiodic channel state information report configuration provided in a medium access control (MAC) control element or downlink control information.

A method of wireless communications at a base station is described. The method may include transmitting a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, receiving, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, determining, based on an uplink reference signal received from the UE, that a first uplink precoding matrix indicator of the subset of uplink precoding matrix indicators is to be used for the uplink transmissions, and transmitting, to the UE, an indication of the first uplink precoding matrix indicator.

An apparatus for wireless communications at a base station is described. The apparatus may include a processor, memory coupled with the processor, and instructions stored in the memory. The instructions may be executable by the processor to cause the apparatus to transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, determine, based on an uplink reference signal received from the UE, that a first uplink precoding matrix indicator of the subset of uplink precoding matrix indicators is to be used for the uplink transmissions, and transmit, to the UE, an indication of the first uplink precoding matrix indicator.

Another apparatus for wireless communications at a base station is described. The apparatus may include means for transmitting a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, receiving, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, determining, based on an uplink reference signal received from the UE, that a first uplink precoding matrix indicator of the subset of uplink precoding matrix indicators is to be used for the uplink transmissions, and transmitting, to the UE, an indication of the first uplink precoding matrix indicator.

A non-transitory computer-readable medium storing code for wireless communications at a base station is described. The code may include instructions executable by a processor to transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, determine, based on an uplink reference signal received from the UE, that a first uplink precoding matrix indicator of the subset of uplink precoding matrix indicators is to be used for the uplink transmissions, and transmit, to the UE, an indication of the first uplink precoding matrix indicator.

In some examples of the method, apparatuses, and non-transitory computer-readable medium described herein, the uplink precoding matrix indicator identifies an index of an uplink precoding matrix that belongs to a set of preconfigured uplink precoding matrixes. Some examples of the method, apparatuses, and non-transitory computer-readable medium described herein may further include operations, features, means, or instructions for receiving a precoded uplink reference signal from the UE, where the uplink precoding matrix indicator corresponds to a precoding matrix applied to the uplink reference signal.

In some examples of the method, apparatuses, and non-transitory computer-readable medium described herein, the subset of uplink precoding matrix indicators include a plurality of pairs of self-interference estimate values and precoding matrix indicators and wherein, for each pair in the plurality of pairs, the self-interference estimate value corresponds to the associated precoding matrix indicator value. In some cases, each pair of the plurality of pairs of self-interference estimate values and precoding matrix indicators is transmitted in a separate channel state information report. In some cases, each pair of the plurality of pairs of self-interference estimate values and precoding matrix indicators is indicated in a single channel state information report that includes an indication of each precoding matrix indication and associated self-interference value that is quantized in a differential manner relative to a first reported self-interference value.

Some examples of the method, apparatuses, and non-transitory computer-readable medium described herein may further include operations, features, means, or instructions for multiplying each codeword in the subset of uplink precoding matrix indicators with an uplink channel matrix to generate a set of equivalent uplink channel matrices that correspond with the subset of uplink precoding matrix indicators, determining a receive signal strength for each of the set of equivalent uplink channel matrices, and determining a downlink transport format and the first uplink precoding matrix indicator based on a magnitude of the determined receive signal strengths. In some examples of the method, apparatuses, and non-transitory computer-readable medium described herein, the first uplink precoding matrix indicator may be determined based on one or more of a highest received signal strength, an indicated signal strength of the downlink reference signal at the UE that is provided in the channel state information report, or any combinations thereof. In some examples of the method, apparatuses, and non-transitory computer-readable medium described herein, the subset of uplink precoding matrix indicators correspond to a preferable or unpreferable subset of the set of available uplink precoding matrix indicators, and where the base station excludes the unpreferable subset of uplink precoding matrix indicators from the set of available uplink precoding matrix indicators when determining the first uplink precoding matrix indicator.

Some examples of the method, apparatuses, and non-transitory computer-readable medium described herein may further include operations, features, means, or instructions for receiving, from the UE, a set of precoded uplink reference signals using a set of different reference signal resources, where each reference signal resource is associated with a different uplink precoding matrix of the subset of uplink precoding matrix indicators, identifying a first precoded uplink reference signal of the set of precoded uplink reference signals based on a receive signal strength of each of the set of precoded uplink reference signals, and determining the first uplink precoding matrix indicator based on the reference signal resource associated with the first precoded uplink reference signal.

Some examples of the method, apparatuses, and non-transitory computer-readable medium described herein may further include operations, features, means, or instructions for transmitting, to the UE, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report, and communicating with the UE in a full duplex mode with concurrent uplink and downlink communications that at least partially overlap in frequency based on the downlink grant information and the uplink grant information.

In some examples of the method, apparatuses, and non-transitory computer-readable medium described herein, the subset of uplink precoding matrix indicators may be provided in a codepoint or a bitmap. In some examples of the method, apparatuses, and non-transitory computer-readable medium described herein, the channel state information report further includes one or more of a rank indicator or a channel quality indicator. In some examples of the method, apparatuses, and non-transitory computer-readable medium described herein, the channel state information report may be a periodic, semi-persistent or aperiodic report.

DETAILED DESCRIPTION

Figure 1:
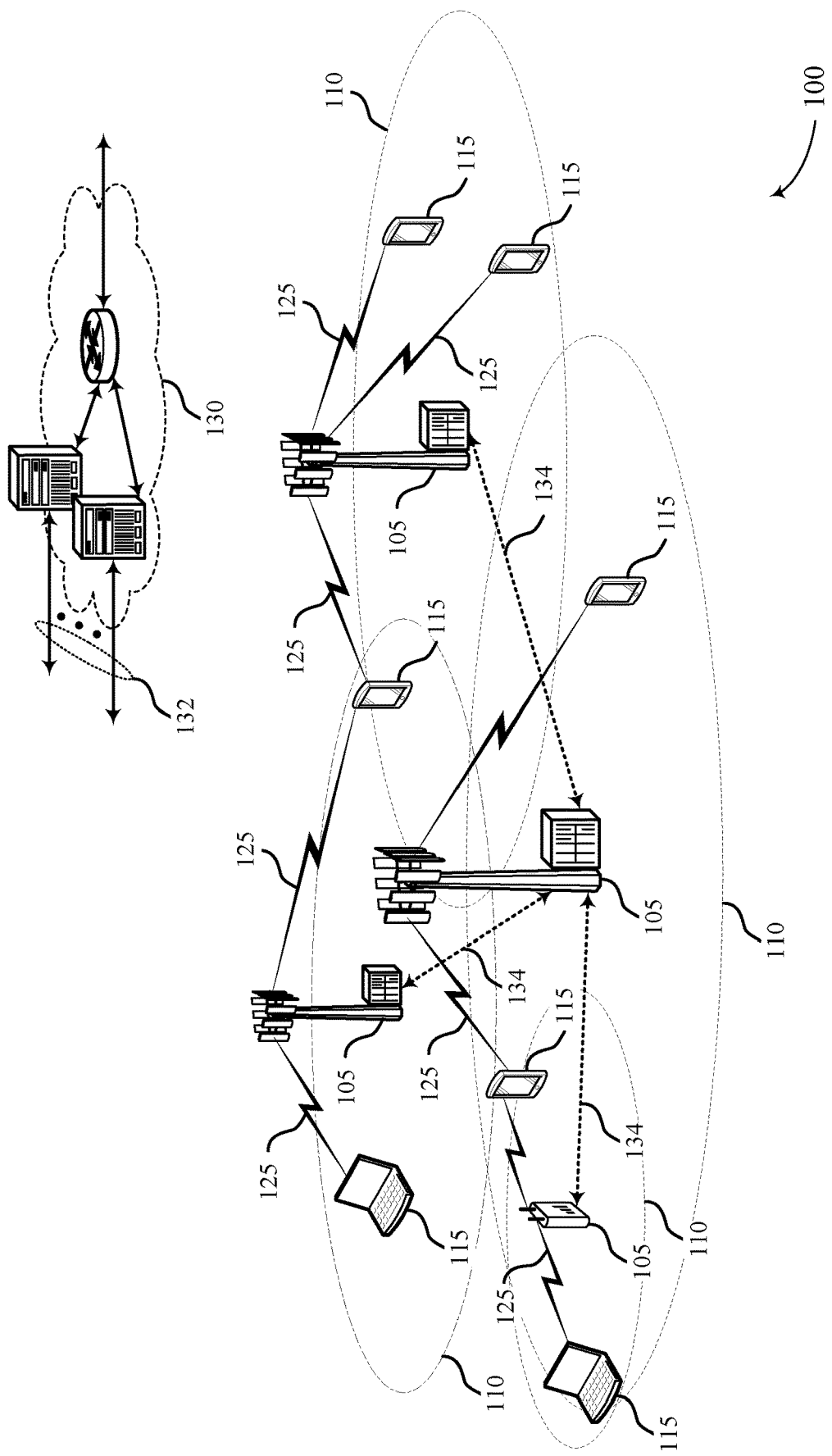
FIG. 1 illustrates an example of a system for wireless communications that supports channel state information reporting techniques for full-duplex user equipment in accordance with aspects of the present disclosure.

In some wireless communications systems, a user equipment (UE) may include a full-duplex capability, where the UE is capable of concurrent transmission and reception using resources that at least partially overlap in both time and frequency. However, the concurrent transmission and reception may result in a self-interference that impacts the downlink reception, uplink transmission, or both, at the UE. Accordingly, a base station may transmit downlink reference signals to the UE for the UE to measure and report the corresponding measurements (e.g., in a channel state information (CSI) report based on downlink CSI reference signals (CSI-RSs)), where the base station uses the report of the measurements to schedule the simultaneous transmission and reception such that the self-interference is mitigated (e.g., by adjusting downlink transmit power, signaling a different uplink transmit power for the UE to use, selection of precoding matrices, etc.).

As described herein, various techniques provide that a UE may generate a measurement report (e.g., a CSI report) based on an estimate of self-interference at the UE from full-duplex communications. In some cases, a UE may receive an indication from a base station of an uplink precoding matrix that is to be applied for uplink transmissions (e.g., a transmit precoding matrix indicator (TPMI) or sounding reference signal (SRS) resource indicator (SRI)), and determine the measurement report (e.g., CSI report) based on the downlink reference signal (e.g., CSI-RS) received from the base station, where the measurement report is based on an estimate of self-interference from a concurrent uplink transmission that uses the indicated uplink precoding. A downlink precoding matrix for downlink transmissions from the base station may be determined based on the measurement report. Full-duplex communications using the uplink and downlink precoding matrices may thus mitigate self-interference and enhance throughput of the full-duplex communications.

Additionally or alternatively, a UE may receive a downlink reference signal (e.g., a CSI-RS) and determine a downlink precoding matrix. Based on the downlink precoding matrix, the UE may determine a subset of uplink precoding matrices based on self-interference estimates associated with uplink transmissions using the subset of uplink precoding matrices and downlink transmissions that use the downlink precoding matrix. The UE may transmit a CSI report and indicate the determined downlink precoding matrix and the subset of uplink precoding matrices. The UE may transmit an uplink reference signal, and the base station may select one of the subset of uplink precoding matrices for use in full-duplex communications with the UE.

Such techniques may allow for mitigation of self-interference at a full-duplex UE, which may enhance throughput and reliability for full-duplex communications. Such techniques may also allow a full-duplex capable UE to report full-duplex mode CSI by associating CSI with an uplink transmit precoding matrix (e.g., that is indexed by TPMI or SRI). Further, a base station can identify the CSI with the self-interference, and determine a pairing of a downlink transport format and uplink transmit precoding matrix, and thus can flexibly and accurately perform downlink and uplink scheduling.

Aspects of the disclosure are initially described in the context of exemplary wireless communications systems. Aspects of the disclosure are further illustrated by and described with reference to process flows, apparatus diagrams, system diagrams, and flowcharts that relate to channel state information reporting techniques for full-duplex user equipment.

FIG. 1 illustrates an example of a wireless communications system 100 that supports channel state information reporting techniques for full-duplex user equipment in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some wireless communications systems (e.g., next generation wireless networks, 5G networks, NR, etc.), ultra-high data rates and a wide scope of application scenarios may be expected to be supported. Accordingly, wireless full-duplex (FD) communications is an emerging technique and may be capable of doubling the link capacity that can accommodate the ultra-high data rates and wide scope of application scenarios. The main idea behind wireless full-duplex may include enabling radio network nodes to transmit and receive simultaneously on a same frequency band and at a same time slot. This simultaneous communication using the same frequency band at the same time may contrast with conventional operations (e.g., half duplex operation, non-full-duplex operations, etc.) where transmission and reception either differ in time and/or in frequency. A full-duplex network node, such as a base station 105 in a cellular network, may communicate simultaneously in uplink and downlink with two half-duplex terminals (e.g., half-duplex UEs 115) using the same radio resources (e.g., same time-frequency resources). Another wireless full-duplex application scenario may include one relay node that can communicate simultaneously with an anchor node and a mobile terminal in a one-hop scenario or with two other relay nodes in a multi-hop scenario. It is expected that by doubling each single-link capacity, full-duplexing may increase the system throughput in diverse applications in wireless communication networks and also reduce a transfer latency for time sensitive services.

Besides the above described scenarios, in some cases one or more UEs 115 (e.g., a full-duplex capable UE 115) may be capable of simultaneous transmission and reception using a same time-frequency radio resource (e.g., working in self-full-duplex mode). However, rather than the above described scenarios where network throughput may be increased but a single-UE throughput may not be increased, with the full-duplex-capable UE 115, a single-UE aggregated downlink and uplink throughput may be increased. Additionally, the full-duplex UE 115 (e.g., full-duplex capable UE 115) may increase single-UE aggregated downlink and uplink throughput for cases when both downlink and uplink traffic are relatively high for a single user. In some cases, enabling full-duplex transmissions may include a capability of canceling a strong self-interference from downlink to uplink at the full-duplex UE 115.

According to various aspects of the present disclosure, a UE 115 operating in full-duplex mode may provide one or more measurement reports that are based on a self-interference estimate associated with concurrent uplink and downlink transmissions. In some cases, a base station 105 may transmit downlink reference signals to the UE 115 for measurement and generation of a measurement report (e.g., a CSI report based on downlink CSI-RSs), where the base station 105 uses the report of the measurements to schedule the simultaneous transmission and reception such that the self-interference from full-duplex mode operations is mitigated.

Figure 2:
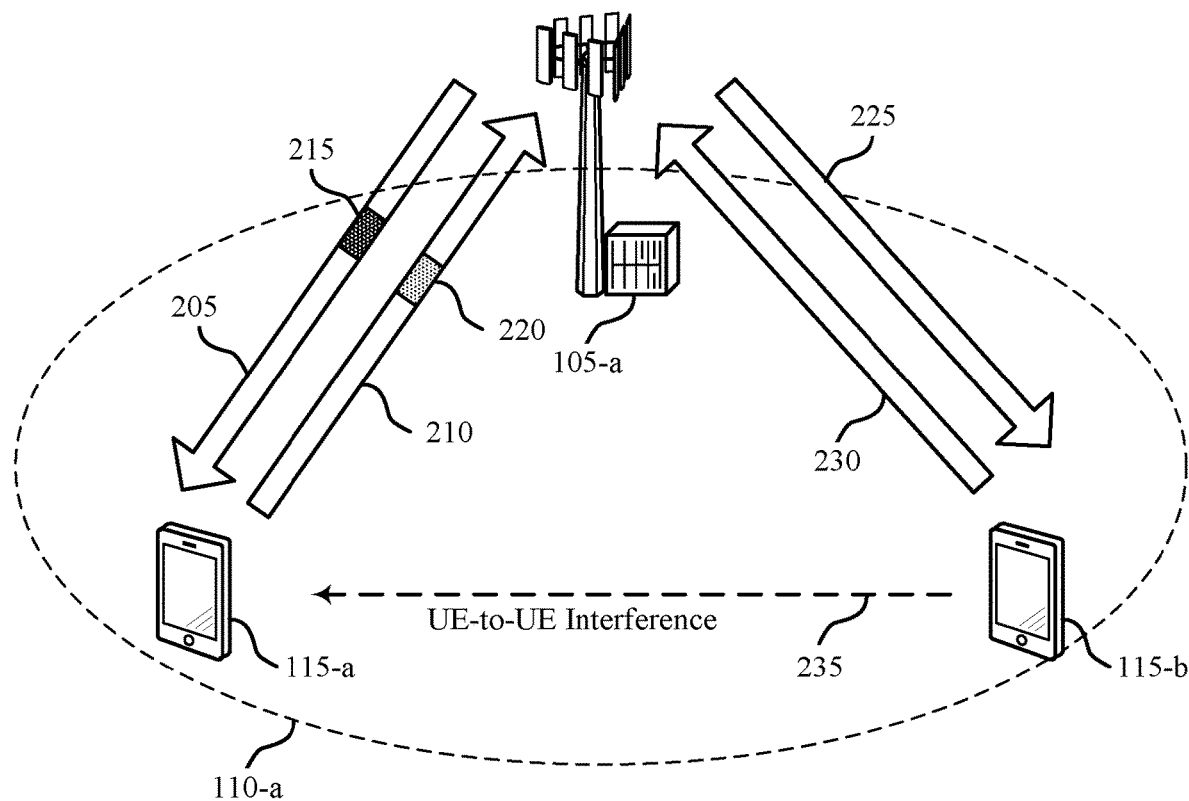
FIG. 2 illustrates an example of a portion of a wireless communications system that supports channel state information reporting techniques for full-duplex user equipment in accordance with aspects of the present disclosure.

FIG. 2 illustrates an example of a wireless communications system 200 that supports channel state information reporting techniques for full-duplex user equipment in accordance with aspects of the present disclosure. In some examples, wireless communications system 200 may implement aspects of wireless communications system 100. Wireless communications system 200 may include a base station 105-a, a first UE 115-a, and a second UE 115-b, which may be in a coverage area 110-a of the base station 105-a. The base station 105-a and UEs 115 may be examples of corresponding devices as described above with reference to FIG. 1.

In some cases, base station 105-a may transmit downlink communications 205 to the first UE 115-a, and receive uplink communications 210 from the first UE 115-a. Likewise, the base station 105-a may transmit downlink communications 225 to the second UE 115-b, and receive uplink communications 230 from the second UE 115-b. In this example, the first UE 115-a may be a full-duplex-capable UE 115 or full-duplex UE 115 as described above with reference to FIG. 1, where the first UE 115-a is capable of simultaneously receiving downlink communications 205 and transmitting uplink communications 210 on a same set of frequency resources (e.g., on a same carrier bandwidth) at a same given time. Thus, in some cases, the first UE 115-a may be subject to self-interference from concurrent uplink and downlink transmissions of the first UE 115-a, as will be discussed in more detail with respect to FIG. 3. Further, in cases where the base station 105-a is operating in full-duplex mode but transmitting downlink communications 205 to the first UE 115-a and receiving uplink communications 230 from the second UE 115-b, the first UE 115-a may experience UE-to-UE interference 235. Such UE-to-UE interference 235 may be accounted for based on one or more measurement reports that are provided by the first UE 115-a, such as CSI report 220 based on a CSI-RS 215 transmission of the base station 105-a that may be transmitted concurrently with an uplink communication 230 of the second UE 115-b. Thus, full-duplex capabilities may cause different interferences based on the simultaneous communications occurring in a system.

As described herein, to mitigate self-interference at UE 115-a that results from the full-duplex capability and the uplink traffic interfering with the downlink traffic, base station 105-a may configure the first UE 115-a to transmit one or more the CSI reports 220. In some cases, the CSI report 220 may be based on an estimation of self-interference at the first UE 115-a of concurrent downlink and uplink transmissions of the first UE 115-a, in accordance with techniques discussed herein. The first UE 115-a may transmit CSI report 220 (e.g., together with or separate from a non-full-duplex mode CSI, a CSI that that indicates UE-to-UE interference 235, or any combinations thereof). In some cases, base station 105-a may perform a CSI calculation based on CSI report 220, and may allocate resources for full-duplex communications as well as transmission formats based on the CSI report 220. Accordingly, base station 105-a, the first UE 115-a, and the second UE 115-b may then transmit uplink/downlink traffic, where uplink/downlink traffic may include simultaneous uplink traffic (e.g., on a PUSCH) and downlink traffic (e.g., on a PDSCH) on same frequency resources at a same time.

Figure 3:
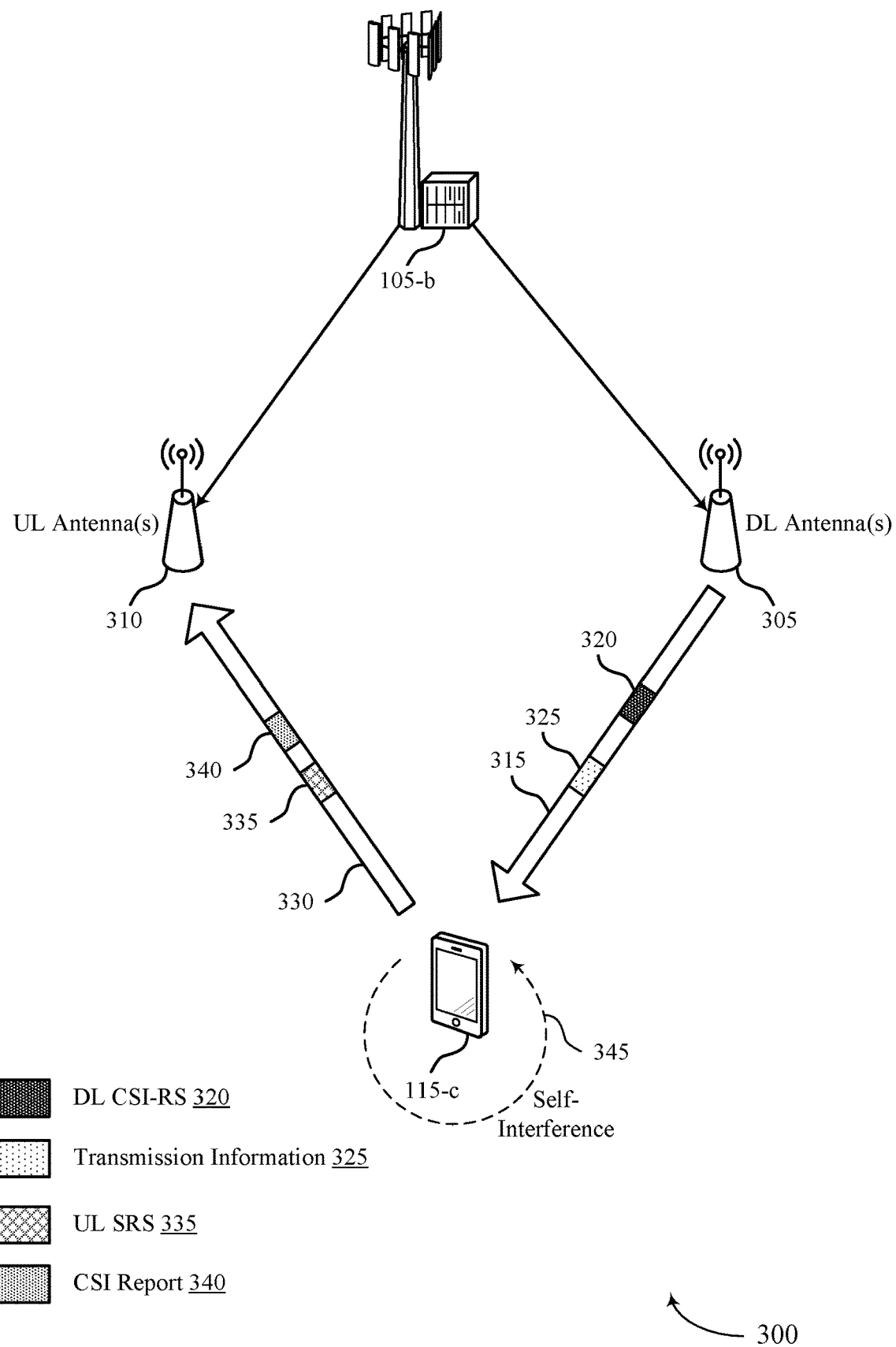
FIG. 3 illustrates another example of a portion of a wireless communications system that supports channel state information reporting techniques for full-duplex user equipment in accordance with aspects of the present disclosure.

FIG. 3 illustrates an example of a wireless communications system 300 that supports channel state information reporting techniques for full-duplex user equipment in accordance with aspects of the present disclosure. In some examples, wireless communications system 300 may implement aspects of wireless communications system 100 or 200. Wireless communications system 300 may include a base station 105-b, a UE 115-c, which may be examples of corresponding devices as described above with reference to FIG. 1 or 2. In this example, the base station 105-b may have separate sets of antennas, including downlink antennas 305 and uplink antennas 310, that may be located at the base station 105-b or one or more of the antennas may be located away from the base station 105-b (e.g., as radio heads associated with an access network controller of base station 105-b). For example, in some cases the downlink antennas 305 may be located remotely from the uplink antennas 310 to reduce their inter-talk interference. In other cases, the downlink antennas 305 may be located relatively close to or even be integrated with the uplink antennas 310 as one antenna set if the inter-antenna interference can be mitigated sufficiently.

In this example, downlink antennas 305 may transmit downlink communications 315 to the UE 115-c, which may include a downlink CSI-RS 320 and downlink transmission information 325 (e.g., downlink data transmitted via PDSCH or PDCCH). Further, uplink antennas 310 may receive uplink communications 330 from the UE 115-c, which may include an uplink sounding reference signal (SRS) and a CSI report 340, as well as uplink information (e.g., uplink data transmitted via PUSCH or PUCCH). In some cases, the CSI report 340 may be based on an estimation of self-interference 345 at the UE 115-c from full-duplex operation at the UE 115-c. In some cases, the UE 115-a, as a full-duplex capable device, may in some cases not operate in full-duplex (FD) mode, which may be referred to as non-self-FD mode. Whether the UE 115-c operates under self-FD mode or non-self-FD mode may depend on one or more of a number of factors, such as whether self-FD mode can achieve higher data rate than non-self-FD mode, a power status or thermal status of the UE 115-c (e.g., that may indicate whether the UE 115-c can transmit, receive, and process concurrent FD transmissions), an amount of data traffic at the UE 115-c or other UEs in wireless communications system 300, or any combinations thereof. Further, in some cases, due to different product design and hardware/software implementations, the capabilities of mitigating self-interference by different full-duplex capable devices, such as UE 115-c, might be different. In some cases, such capability for a given device may be fixed and provided in a capability indication to the base station 105-b. In other cases, such capability for a given device may be variable, depending upon, for example, the device's transmission power, transmission bandwidth, transmission beamforming (precoding) weight, or any other factors, or combinations thereof.

In some cases, UE 115-c and base station 105-b may use uplink and downlink precoding matrices to mitigate the self-interference 345 at the UE 115-c. In some cases, the UE 115-c may generate the CSI report 340 based on an estimate of the self-interference 345 at the UE 115-c. For example, the UE 115-c may receive an indication from the base station 105-b of an uplink precoding matrix that is to be applied for uplink communications 330. Such an indication of the uplink precoding matrix may be provided, for example, in a transmit precoding matrix indicator (TPMI) or sounding reference signal (SRS) resource indicator (SRI). The TPMI may provide an index into a codebook based PUSCH that indicates a transmit precoding matrix that is to be used as the uplink precoding matrix. In other cases, the UE 115-c may transmit multiple uplink SRSs 335 using different SRS resources that have different uplink precoding, and a SRI of a particular uplink SRS 335 may indicate that an associated precoding matrix is to be used as the uplink precoding matrix. The UE 115-c may determine the CSI report 340 based on the downlink CSI-RS 320 and based on an estimate of self-interference 345 from a concurrent uplink transmission that uses the indicated uplink precoding. In some cases, a downlink precoding matrix indicator (PMI) may be determined based on the CSI-RS 320 and the estimate of self-interference 345, and provided with the CSI report 340. Full-duplex communications using the uplink and downlink precoding matrices may be commenced, in which the self-interference 345 is mitigated, and throughput of the full-duplex communications enhanced relative to throughput without such mitigation.

Additionally or alternatively, the UE 115-c may receive the CSI-RS 320 and determine a downlink precoding matrix. Based on the downlink precoding matrix, the UE 115-c may determine a subset of uplink precoding matrices based on self-interference estimates associated with uplink transmissions using the subset of uplink precoding matrices and downlink transmissions that use the downlink precoding matrix. The UE 115-c may transmit the CSI report 340 and indicate the determined downlink precoding matrix and the subset of uplink precoding matrices. The UE 115-c may then transmit the uplink SRS 335, and the base station 105-b may select one of the subset of uplink precoding matrices for use in full-duplex communications with the UE 115-c. In some cases, the estimate of self-interference 345 may be preconfigured at the UE 115-c (e.g., based on measurements of self-interference during full-duplex communications according to different combinations of uplink and downlink precoding matrices).

As indicated, in some cases the uplink precoding matrix may be indicated by TPMI. Such an indicator may be associated with an uplink codebook-based transmission in PUSCH that can have maximally four layers for one UE. This codebook may be hard coded in the UE 115-c or be pre-configured from the base station 105-b to the UE 115-c in high-layer message in an initial access phase. The configured codebook may contain four lists of precoding matrixes, each of which corresponds to a rank value (from rank 1 to rank 4). The index to indicate the rank value and the codeword may be referred to as the Transmit Precoding Matrix Indicator (TPMI). For codebook based transmissions, the TPMI and the transmission rank may be provided by downlink control information (DCI) fields of a SRS resource indicator and Precoding information in DCI format 0-1 to indicate the transport format of PUSCH. In some cases, due to UE capability restrictions, only a subset of pre-configured codewords can be used by one UE (e.g., only the codeword with one non-zero element when only one transmission antenna can be used at one time). In such cases, the base station 105-b may determine a usable codeword subset and sends it to UE 115-c. Since the codebook subset size is smaller than the full set size, less bits in DCI are consumed to indicate TPMI. Such a codebook subset may be caused by a UE capability restriction and hence be statically configured by high layer (like RRC layer) message.

Additionally, in cases where the UE 115-c transmits the uplink SRS 335 using a precoding matrix, the associated SRI can be used to represent the uplink precoding matrix. In some cases, the SRI may be indicated in DCI format 0-1, which thus provides the uplink precoding matrix for the PUSCH granted by the DCI. For both TMPI and SRI, prior techniques thus provide indications in downlink information (e.g., in DCI). Various aspects of the present disclosure also provide that such TMPI or SRI may also be provided in CSI report 340, in a CSI report configuration provided by the base station 105-b, or both.

As discussed, CSI report 340 may provide measurement report information that is based on an estimated self-interference 345 at the UE 115-c. In some cases, the self-interference 345 of a full-duplex capable UE 115-c in self-FD mode may change (e.g., when the UE 115-c transmits with a different uplink precoding matrix). When the uplink precoding matrix (e.g., indexed by TPMI or SRI) generates an influence matrix of self-interference that lies in a null subspace of a downlink equivalent channel matrix (determined by the downlink precoding matrix) of the UE 115-c, the self-interference from full-duplex transmissions may be alleviated. On the contrary, when a TPMI or SRI generates a self-interference influence matrix that lies in the signal subspace of the downlink equivalent channel matrix, the self-interference from full-duplex transmissions may be strengthened. By providing that the UE 115-c can dynamically determine a pair of PMI and TPMI/SRI for full-duplex communications, which can achieve improved aggregated throughputs for uplink and downlink communications. Thus, the base station 105-b, rather than determining the uplink TPMI/SRI based on the measurement of SRS 335 without considering the impact of this TPMI/SRI on self-interference strength, may consider the impact of the TPMI/SRI. Further, the UE 115-c, rather than determining the downlink PMI based on the measurement of CSI-RS 320 without considering the vulnerability of this PMI as impacted by self-interference 345, may consider the self-interference when determining the PMI and generating the CSI report 340. In some cases, the base station 105-b may adopt the received PMI in CSI report 640 as the downlink precoding matrix, and therefore the pairing of downlink precoding matrix and uplink TPMI is equivalent to the pairing of downlink PMI and UL TPMI/SRI. Additionally, different uplink granted TPMI may lead to different self-interference 345 strength, and a different downlink signal to interference and noise ratio (SINR), and techniques as provided herein may allow for the base station 105-b to schedule the UE 115-c based on the appropriate self-interference.

Figure 4:
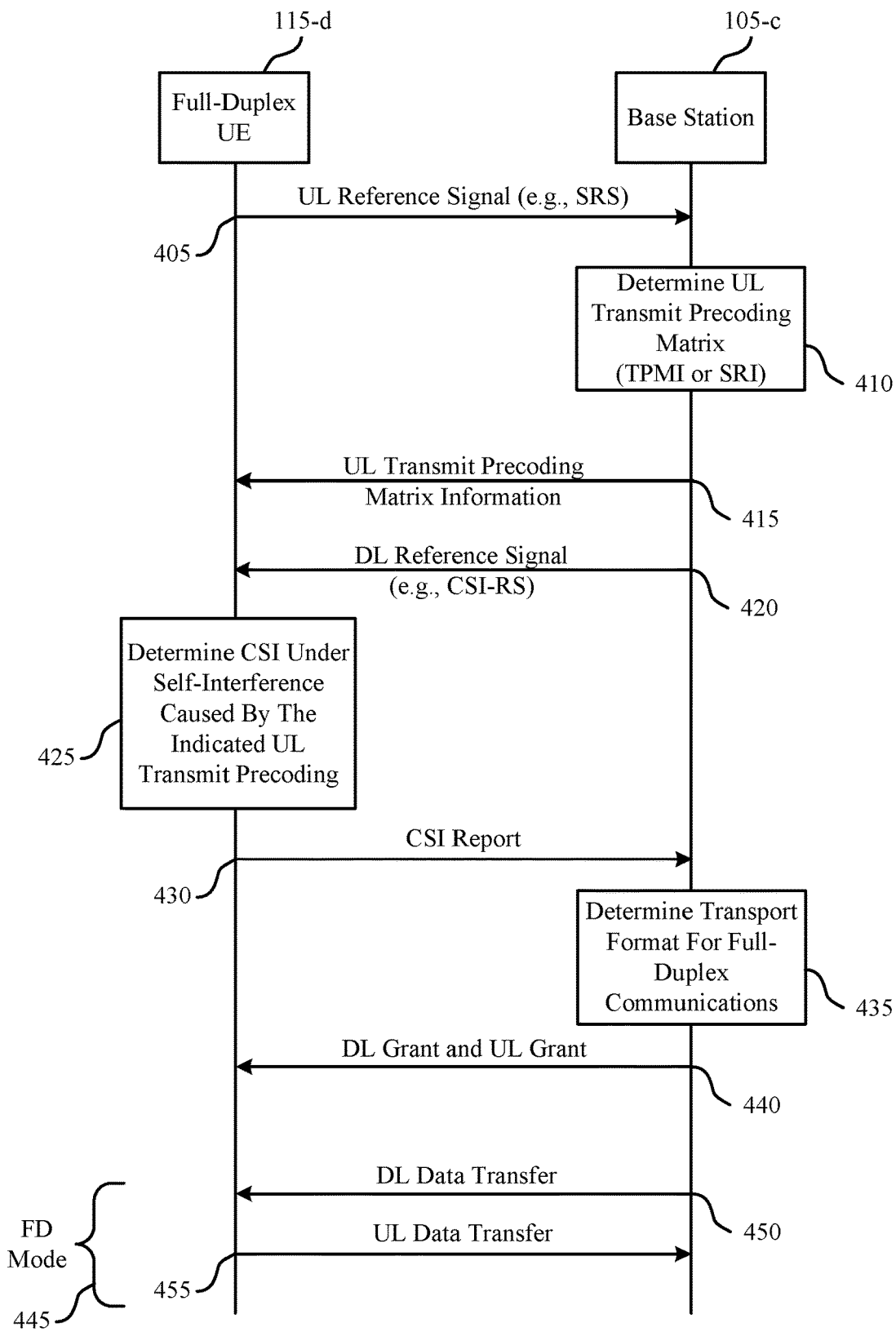
FIG. 4 illustrates an example of a process flow that supports channel state information reporting techniques for full-duplex user equipment in accordance with aspects of the present disclosure.

FIG. 4 illustrates an example of a process flow 400 that supports channel state information reporting techniques for full-duplex user equipment in accordance with aspects of the present disclosure. In some examples, process flow 400 may implement aspects of wireless communications system 100, 200, or 300. Process flow 400 may include a base station 105-c and a UE 115-d, which may be examples of corresponding base stations 105 and UEs 115, respectively, as described above with reference to FIGS. 1-3. As described herein, UE 115-d may be a full-duplex capable UE as described above.

In the following description of the process flow 400, the operations between UE 115-d and base station 105-c may be transmitted in a different order than the order shown, or the operations performed by base station 105-c and UE 115-d may be performed in different orders or at different times. Certain operations may also be left out of the process flow 400, or other operations may be added to the process flow 400. It is to be understood that while base station 105-c and UE 115-d are shown performing a number of the operations of process flow 400, any wireless device may perform the operations shown.

In this example, the base station 105-c may first determine the uplink precoding matrix, and then the UE may provide a CSI report that is based on an estimate of self-interference at the UE 115-d that is associated with the uplink precoding matrix. Based on the CSI report, a downlink precoding matrix may be determined and used for downlink transmissions, thus providing downlink transmissions with a precoding matrix that accounts for self-interference based on uplink transmissions with the uplink precoding matrix.

At 405, UE 115-d may transmit an uplink reference signal (e.g., a SRS) to the base station 105-c. The uplink reference signal may, in some cases, be transmitted using an uplink precoding matrix that is indicated by a SRI. In some cases, the UE 115-d may transmit a number of uplink reference signals using different resources that have different associated SRIs.

At 410, the base station 105-c may determine an uplink precoding matrix (e.g., as indexed by TMPI or SRI) based on the uplink reference signal. In some cases, the base station 105-c may adopt an uplink precoding matrix associated with a SRI of the uplink reference signal. In other cases, the base station 105-c may determine a TPMI based on measurements of the uplink reference signal. In some cases, the base station 105-c may dynamically determine TPMI or SRI based on the measurement of the uplink reference signal for transmission to the UE 115-d. In some cases, a determination of the TPMI is based on a derived UE 115-d uplink channel response matrix by measuring the uplink reference signal (e.g., SRS), and then selecting an index of the uplink precoding codeword that best matches this uplink channel response matrix (e.g., that can generate the largest SINR) as the determined TPMI. Alternatively, if the UE 115-d has sent multiple precoded reference signals at different reference signal resources (e.g., SRS resources), then the base station 105-c may select one reference signal that has a relatively large or the largest receive SINR, and use the associated uplink resource index (e.g., SRI) as the determined uplink precoding matrix index.

In some cases, the radio channel time-domain variance and frequency-domain fluctuation may lead to different determined uplink precoding matrices (e.g., different TPMI or SRI). Therefore, in some cases, the base station 105-c may determine and provide the uplink precoding matrix information (e.g., TPMI/SRI) of each UE 115-d on a per-slot basis or per-subband basis (e.g., could be wideband or per-subband).

At 415, the base station 105-c may transmit an indication of the uplink transmit precoding matrix to the UE 115-d. In some cases, the base station 105-c may trigger the UE 115-d to report CSI by providing an indication of the uplink transmit precoding matrix (e.g., TPMI) or indication of sounding reference signal resource (e.g., SRI). In some cases, the base station 105-c may indicate the uplink precoding matrix (e.g., TPMI or SRI) in a CSI report configuration. In some cases, because the contained uplink precoding matrix (e.g., TPMI or SRI) may be dynamically variant, the base station 105-c may use an aperiodic CSI report configuration which may be indicated, for example, by a MAC layer message (MAC CE) or a physical layer message (DCI). At 420, the base station 105-c may transmit a downlink reference signal (e.g., CSI-RS) to the UE 115-d.

At 425, the UE 115-d may monitor for the downlink reference signal, make one or more measurements of the downlink reference signal, and determine CSI under self-interference caused by the indicated uplink precoding matrix. In some cases, the UE 115-d may calculate a self-FD mode CSI by assuming that the UE has $M_t$ transmit antennas and $M_r$ receive antennas under self-FD mode, and the BS has $M_t'$ transmit antennas for downlink transmissions.

In one example, the UE 115-d may measure the downlink channel status, resulting in a downlink signal matrix, denoted as H whose size is $M_r \times M_t'$, without any uplink transmission (i.e., zero-power UL) at the resource elements of the downlink reference signal (e.g., CSI-RS). Then, the UE 115-d may add the impact of self-interference on top of the measured downlink channel status. In such cases, the UE 115-d may measure the self-interference matrix, denoted as H' whose size is $M_r \times M_t$, corresponding to the uplink transmission precoding matrix (e.g., as indicated by the TPMI or SRI). The UE 115-d may then calculate the SINR by mitigating the self-interference over the received signal, by projecting the downlink signal matrix onto a null subspace of self-interference matrix, or by whitening the composite interference-plus-noise matrix (i.e., the sum of self-interference matrix and the non-FD interference-plus-noise matrix). Finally, the UE 115-d may generate a self-FD mode CSI based on the downlink channel status and the impact of self-interference. This CSI may be used to determine a downlink precoding matrix. In another example, the UE 115-d may measure the downlink channel status with the uplink transmission which is precoded by the uplink transmission precoding matrix that is indicated by the base station 105-c (e.g., via TPMI or SRI), at the resource elements of the downlink reference signal (e.g., CSI-RS). At 430, UE 115-d may transmit the CSI report to the base station 105-c.

At 435, base station 105-c may determine a transport format for full-duplex communications. In some cases, the base station 105-c may determine a radio resource allocation, a downlink transport format for downlink data transfer, and an uplink transport format for uplink data transfer based on the CSI report. In some cases, the base station 105-c may determine, based on the CSI report, a downlink transport format (e.g., including MCS, transmitting precoding matrix, etc.) which is simultaneous with the determined UL transmit precoding matrix.

At 440, UE 115-d may receive, from base station 105-c, an uplink grant and a downlink grant based on the CSI report and the determined transport format. In some cases, base station 105-c may transmit the uplink grant and the downlink grant based on the radio resource allocation, the downlink transport format, and an uplink transport format.

At 445, UE 115-d may enter a full duplex mode. Accordingly, at 450 and 455, UE 115-d may simultaneously transmit an uplink data transmission based on the uplink grant and receive a downlink data transmission based on the downlink grant.

Figure 5:
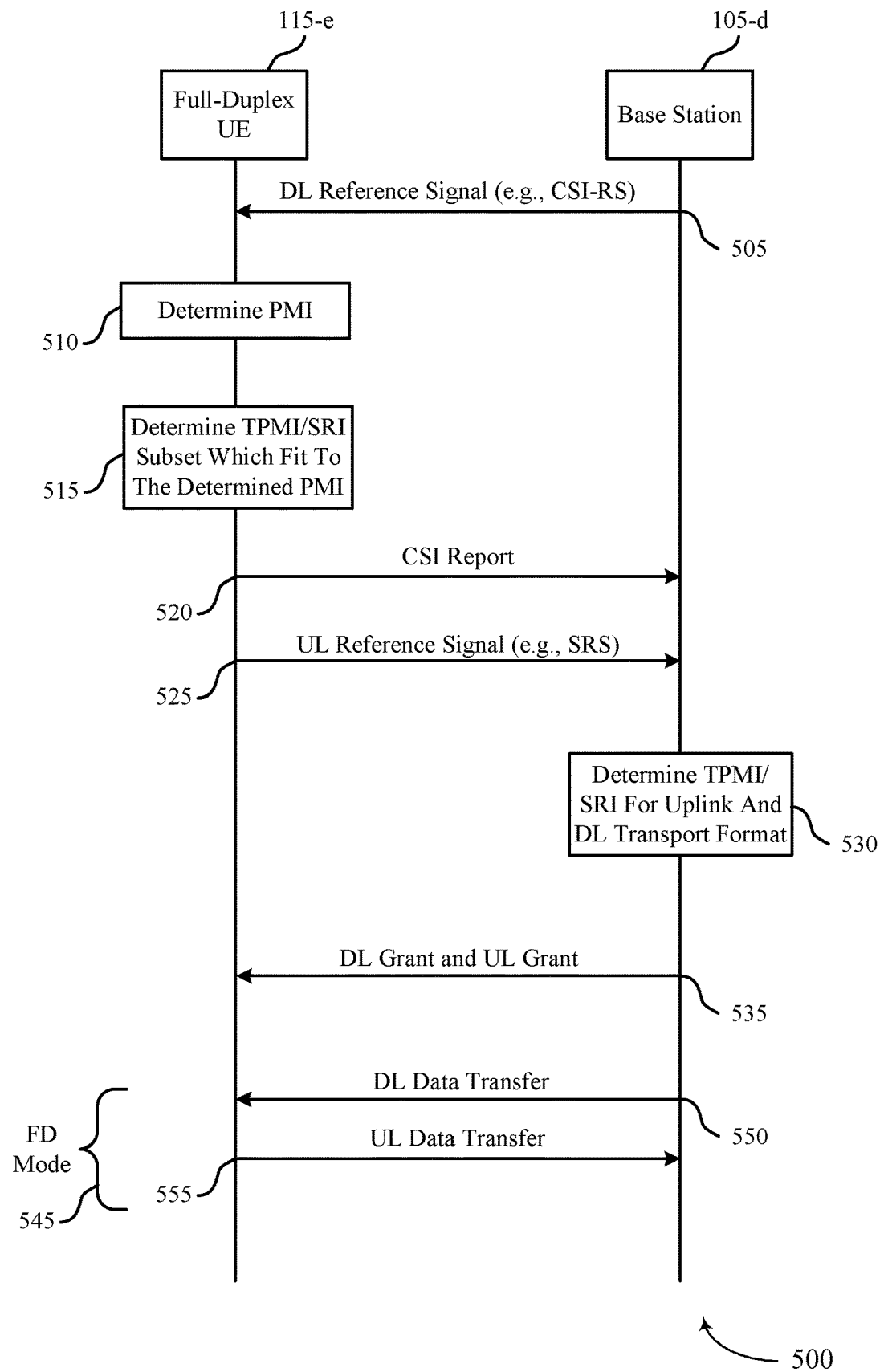
FIG. 5 illustrates another example of a process flow that supports channel state information reporting techniques for full-duplex user equipment in accordance with aspects of the present disclosure.

FIG. 5 illustrates an example of a process flow 500 that supports channel state information reporting techniques for full-duplex user equipment in accordance with aspects of the present disclosure. In some examples, process flow 500 may implement aspects of wireless communications system 100. Process flow 500 may include a base station 105-d and a UE 115-e, which may be examples of corresponding base stations 105 and UEs 115, respectively, as described above with reference to FIGS. 1-3. As described herein, UE 115-e may be a full-duplex capable UE as described above.

In the following description of the process flow 500, the operations between UE 115-e and base station 105-d may be transmitted in a different order than the order shown, or the operations performed by base station 105-d and UE 115-e may be performed in different orders or at different times. Certain operations may also be left out of the process flow 500, or other operations may be added to the process flow 500. It is to be understood that while base station 105-d and UE 115-e are shown performing a number of the operations of process flow 500, any wireless device may perform the operations shown.

In this example, the UE 115-e may determine a subset of preferable or unpreferable TPMIs or SRIs based on a downlink precoding matrix that is provided by the base station 105-d. The UE 115-e may provide the CSI and the subset of precoding matrices, and the base station may determine the uplink precoding matrix based on an uplink reference signal and the indicated subset of uplink precoding matrices. In some cases, the UE 115-e determines the preferable or unpreferable uplink precoding matrix subset out of all usable uplink precoding matrices (e.g., all usable TPMIs or SRIs) based on the CSI measurement, an estimated full-duplex self-interference, and the determined PMI, for transmission to the base station 105-e in a CSI report together with the associated CSI.

At 505, the base station may transmit a downlink reference signal (e.g., CSI-RS) to the UE 115-e. At 510, the UE 115-e may determine CSI, including a downlink precoding matrix (e.g., a PMI), based on the downlink reference signal. At 515, the UE 115-e may determine a subset of uplink precoding matrices (e.g., a subset of TMPI/SRI values) which fit the determined downlink precoding matrix. In some cases, the UE 115-e may determine a preferable uplink precoding matrix subset by first determining the downlink precoding matrix (e.g., PMI) based on the downlink reference signal (e.g., CSI-RS), and then using the downlink precoding matrix to determine the preferable or unpreferable subset of uplink precoding matrices based on the self-interference measurement.

In some cases, the UE 115-e may measure the downlink reference signal (e.g., CSI-RS) sent from the base station 105-d while sending an uplink signal at the identical time-frequency radio resources. The UE 115-e may then estimate the signal matrix for the downlink channel and the self-interference matrix based on measuring the downlink reference signal, which suffers from the self-interference matrix with one usable uplink precoding matrix. After the UE 115-e derives both the signal matrix and self-interference matrix, it can calculate the SINR value under self-interference. If the SINR value is larger than a pre-configured threshold, this uplink precoding matrix may be identified as a preferable matrix for inclusion in the subset of preferable precoding matrices, and if the SINR is at or below the pre-configured threshold, this uplink precoding matrix may be identified as unpreferable. In one example, the UE 115-e may calculate a number of equivalent interference matrices by multiplying each codeword in usable uplink precoding matrix indicators with the derived self-interference matrix, and then select a number (m') of equivalent interference matrices that can generate the largest SINR values for the derived signal matrix, whose corresponding precoding matrices are used as the preferable subset. Alternatively, the UE 115-e may select the equivalent interference matrices that can generate the smallest SINR for the derived signal matrix, whose corresponding precoding matrices are used as the unpreferable subset.

In some cases, the UE 115-e may identify an order for determining the downlink precoding matrix and the subset of uplink precoding matrices. In some cases, the UE 115-e may first determine the downlink PMI (e.g., based on CSI-RS measurements), and then determine the subset of uplink precoding matrices that fit to this PMI (i.e., when the uplink precoding matrix is used, the downlink receive SINR with the determined PMI is higher than a pre-configured threshold). In other cases, the UE 115-e may jointly determine PMI and the subset of uplink precoding matrices (i.e., when a PMI and an uplink precoding matrix are used, the downlink receive SINR is higher than the pre-configured threshold). In some cases, one or more other entries in CSI may also be impacted by the determination result of preferable/unpreferable subsets of uplink precoding matrices, and in such cases, after choosing a certain uplink precoding matrix, a rank indicator (RI), PMI, channel quality indicator (CQI), of combinations thereof, may be recalculated based on the corresponding self-interference.

In some cases, the UE 115-e may determine a list of pairs of CSI and uplink precoding matrices (e.g., a list of CSI-TMPI/SRI pairs). For each pair in the list of pairs, the CSI value is conditioned to the precoding matrix value (e.g., the TPMI/SRI value). Thus, the self-interference to the received signal is generated by adopting the precoding matrix (e.g., the TPMI/SRI value) in the concurrent uplink transmission.

In some cases, the UE 115-e may sort all possible precoding matrices (e.g., all available TPMI/SRI values) according to their self-interference strengths from low to high, and then select the first number of precoding matrices whose self-interference strengths are the lowest. In some cases, the UE may calculate a respective matched CSI value (including PMI, RI, CQI) for each selected precoding matrix. In some examples, UE 115-e may receive a CQI threshold from the base station 105-d, which provides a maximum offset between the reported largest CQI value and each reported CQI value. The UE 115-e may then not determine a CSI-precoding matrix pair whose CQI value is smaller than the reported largest CQI value subtracting this CQI threshold.

At 520, the UE 115-e may transmit the CSI report, including the determined downlink precoding matrix and the subset of uplink precoding matrices. In some cases, the CSI report may include a preferable or unpreferable uplink precoding matrix subset that is provided to the base station 105-d. In some cases, a codepoint or a bitmap can be used to represent this preferable or unpreferable uplink precoding matrix (e.g., TPMI/SRI) subset. Such a codepoint may be mapped to one out of a list of uplink precoding matrix subsets. In cases that use a bitmap, the bitmap length may be equal to the number of all usable uplink precoding matrices and represent which uplink precoding matrices are included in the subset of uplink precoding matrices.

In cases that use a codepoint to indicate the subset of uplink precoding matrices, a list of codepoints may be hard-coded or pre-configured. For example, m elements may be contained in the usable uplink precoding matrix set and m' elements are contained in the preferable/unpreferable uplink precoding matrix subset, where m'≤5 m, there are a total of $C_m^{m'}$ possible uplink precoding matrix subsets, where $$C_m^{m'} = \frac{m!}{m'!(m - m')!}$$

is a combinatorial number. Then, $\lceil \log_2 C_m^{m'} \rceil$ bits are needed to represent this codepoint whose value scope is from 0 to $C_m^{m'}-1$.

In some cases, it may be hard-coded or pre-configured that m elements are contained in the usable uplink precoding matrix set and at most m' elements are contained in the preferable/unpreferable uplink precoding matrix subset, and thus there are a total of $\Sigma_{l=0}^{m'} C_m^l$ possible candidate uplink precoding matrix subsets. Then, $\lceil \log_2 \Sigma_{l=0}^{m'} C_m^l \rceil$ or $\Sigma_{l=0}^{m'} \lceil \log_2 C_m^l \rceil$ bits are needed to represent this codepoint. Alternatively, a length-m bitmap can be used to represent the selection of m uplink precoding matrix values, whose m' bins are set to one (e.g., indicating the corresponding uplink precoding matrix is selected) and other m–m' bins are set to zero (e.g., indicating the corresponding uplink precoding matrix is not selected). In some cases, if the preferable/unpreferable uplink precoding matrix subset is empty, it means none or all uplink precoding matrices are preferable. Together with uplink precoding matrix subset, the corresponding other CSI entries (e.g., RI/PMI/CQI) may also be reported in CSI-report. The CSI report contents may be in periodic, semi-persistent or aperiodic CSI reports.

In cases where the UE 115-e determines a list of pairs of CSI and uplink precoding matrices, the UE 115-e may provide an indication of the selected CSI-precoding matrix pairs in the CSI report. In some examples, the UE 115-e may send a number of CSI reports, each of which contains a CSI-precoding matrix pair (e.g., a separate CSI report for each CSI-TPMI/SRI pair). In other examples, to provide a reduced size CSI report payload, the UE 115-e may transmit a single CSI report, where multiple CSI values are quantized in a differential manner. In such examples, the CSI report may include a common CSI value and a plurality of differential CSI values, each of which corresponds to a reported precoding matrix value (e.g., a differential value for each reported CSI-TPMI/SRI pair). For example, a common CQI value and a plurality of differential CQI values may be reported, where the common CQI value is quantized with a larger number of bits and each differential CQI value is quantized with a smaller number of bits. Additionally, the UE 115-e may transmit a non-FD CSI report, which contains the CSI value by assuming there is no simultaneous uplink transfer based on any TPMI (thus there is no self-interference).

At 525, the UE 115-e may transmit an uplink reference signal (e.g., a SRS) to the base station 105-d. At 530, the base station 105-d may determine an uplink precoding matrix (e.g., as indexed by TMPI or SRI) based on the uplink reference signal and the indicated subset of uplink precoding matrices, and a downlink transport format. In some cases, the base station 105-d may determine the pairing of uplink precoding matrix and downlink transport format. In some cases, base station 105-*d* may determine the downlink/uplink grant according to the received preferable/unpreferable uplink precoding matrix subset and the measured uplink channel matrix.

In cases where the UE 115-*e* reports the preferable TPMI subset, base station 105-*d* can multiply each codeword in this preferable TPMI subset with uplink channel matrix, resulting in the equivalent uplink channel matrix. Then base station 105-*d* may calculate the receive SINR value based on each equivalent uplink channel matrix. Finally, base station 105-*d* may judge whether the largest receiving SINR value out of all the equivalent uplink channel matrixes is satisfactory (e.g., beyond a pre-configured threshold). If the judgment is positive, the corresponding downlink transport format and uplink TPMI can be paired in self-FD communication mode for the UE 115-*e*. In cases where the UE 115-*e* reports the unpreferable TPMI subset, base station 105-*d* can first generate the preferable TPMI subset by omitting the unpreferable TPMI subset from the full TPMI set. The following operations are the same as above.

In cases where the UE 115-*e* reports the preferable/unpreferable SRI subset, base station 105-*d* may first obtain the SINR value for each SRI in the reported SRI subset. These SINR values can be obtained by measuring receive SINR when the SRS corresponding to one SRI is sent by the UE 115-*e*. The following operations are the same as above. If the pairing of downlink transport format (determined by the reported CSI) and uplink precoding matrix is successful, the uplink precoding matrix that gets the largest metric may be selected. The metric may be, for example, uplink receive SINR, downlink receive SINR (obtained from reported CSI) or a combination thereof.

In cases where the UE 115-*e* determines a list of pairs of CSI and uplink precoding matrices, the base station 105-*d* may select one of the reported CSI-precoding matrix pairs for FD communications. In some cases, the base station 105-*d* may determine the uplink/downlink grant according to the received CSI-precoding matrix pairs and the measured uplink channel matrix. For example, the base station 105-*d* may multiply each codeword in the reported precoding matrix values (e.g., TPMI/SRI values) with the uplink channel matrix, resulting in the equivalent uplink channel matrix. Then the base station 105-*d* may calculate the receive SINR value based on each equivalent uplink channel matrix, and determines whether the largest receiving SINR value out of all the equivalent uplink channel matrices is satisfactory (e.g. beyond a pre-configured threshold). If the determination is positive, the corresponding downlink transport format and uplink precoding matrix (e.g., TPMI/SRI) can be paired in self-FD communication mode for the UE 115-*e*. If the pairing of downlink transport format (determined by the reported CSI) and reported uplink precoding matrix (e.g., TPMI/SRI) is successful, the precoding matrix that gets the largest metric may be selected. The metric can be, for example, uplink receive SINR, downlink receive SINR (obtained from reported CSI), or any combinations thereof. If the non-FD CSI report is also received, the base station 105-*d* may determine to schedule a FD or non-FD communication with this UE 105-*e*, based on the above-mentioned selection metrics.

At 535, base station 105-*d* may provide a downlink and uplink grant to the UE 115-*e*. In some cases, the uplink grant (containing selected uplink precoding matrix) and associated downlink grant (containing downlink transport format) is sent from base station 105-*d* to the UE 115-*e*, to trigger the bi-directional self-FD communication with the UE 115-*e*.

At 545, UE 115-*e* may enter a full duplex mode. Accordingly, at 550 and 555, UE 115-*e* may simultaneously transmit an uplink data transmission based on the uplink grant and receive a downlink data transmission based on the downlink grant.

In some cases, a UE and base station may use one of the process flows of FIGS. 4 and 5 selectively in accordance with current conditions. For example, because the process flow 400 of FIG. 4 first decides uplink transmit precoding while process flow 500 of FIG. 5 first decides the downlink PMI, process flow 400 may be selected in cases with higher importance in uplink transmissions (e.g., based on mission critical data that is to be provided by a UE), while process flow 500 may be selected in cases with higher importance in downlink transmissions (e.g., based on mission critical data that is to be provided to a UE).

Figure 6:
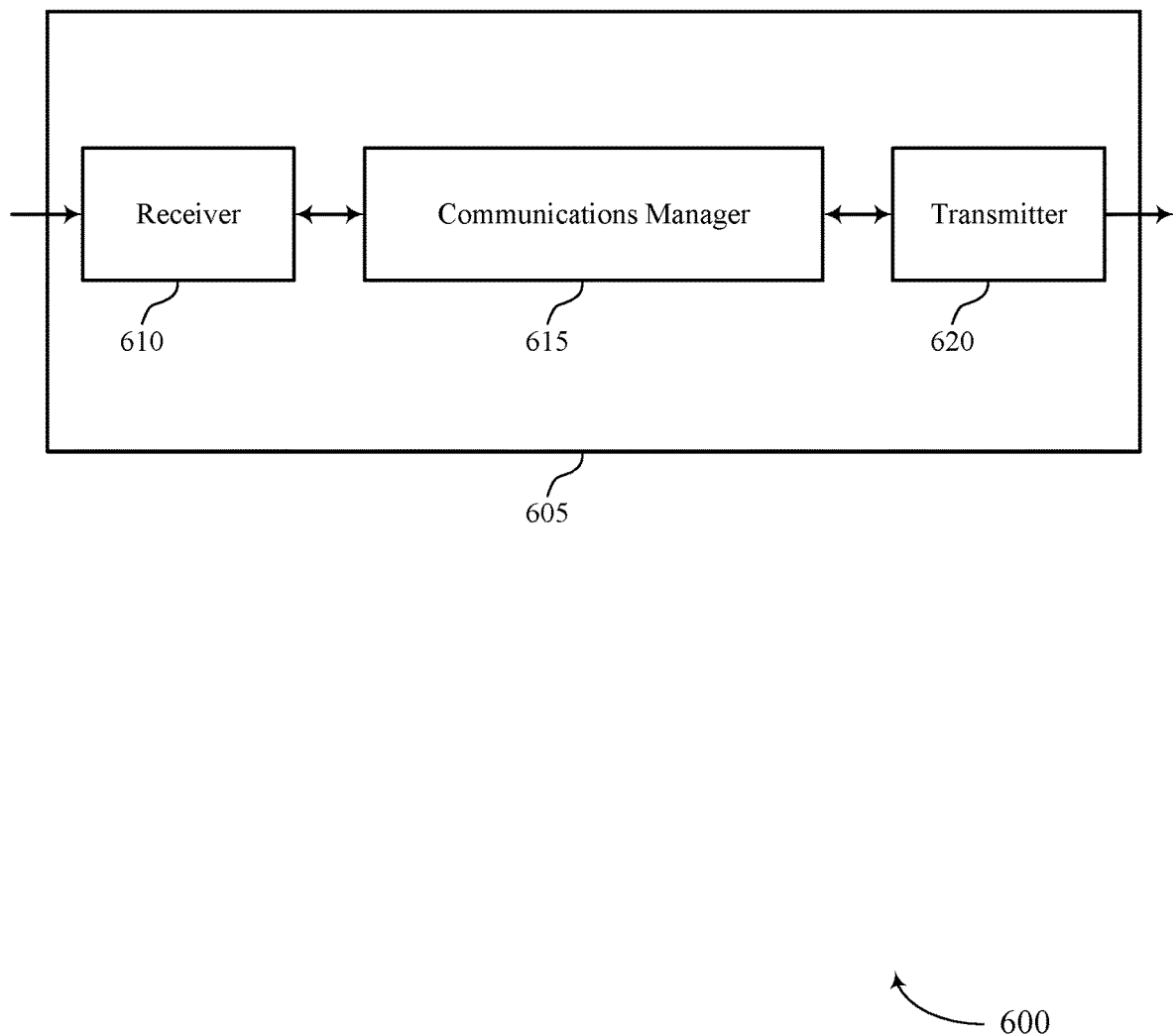
FIGS. 6 and 7 show block diagrams of devices that support channel state information reporting techniques for full-duplex user equipment in accordance with aspects of the present disclosure.

FIG. 6 shows a block diagram 600 of a device 605 that supports channel state information reporting techniques for full-duplex user equipment in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to channel state information reporting techniques for full-duplex user equipment, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmit the channel state information report to the base station.

The communications manager 615 may also determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmit, to the base station, a channel state information report indicating at least the downlink precoding matrix indicator and the subset of uplink precoding matrix indicators, and receive, from the base station, an indication of which of the subset of uplink precoding matrix indicators are to be used for the uplink transmissions. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
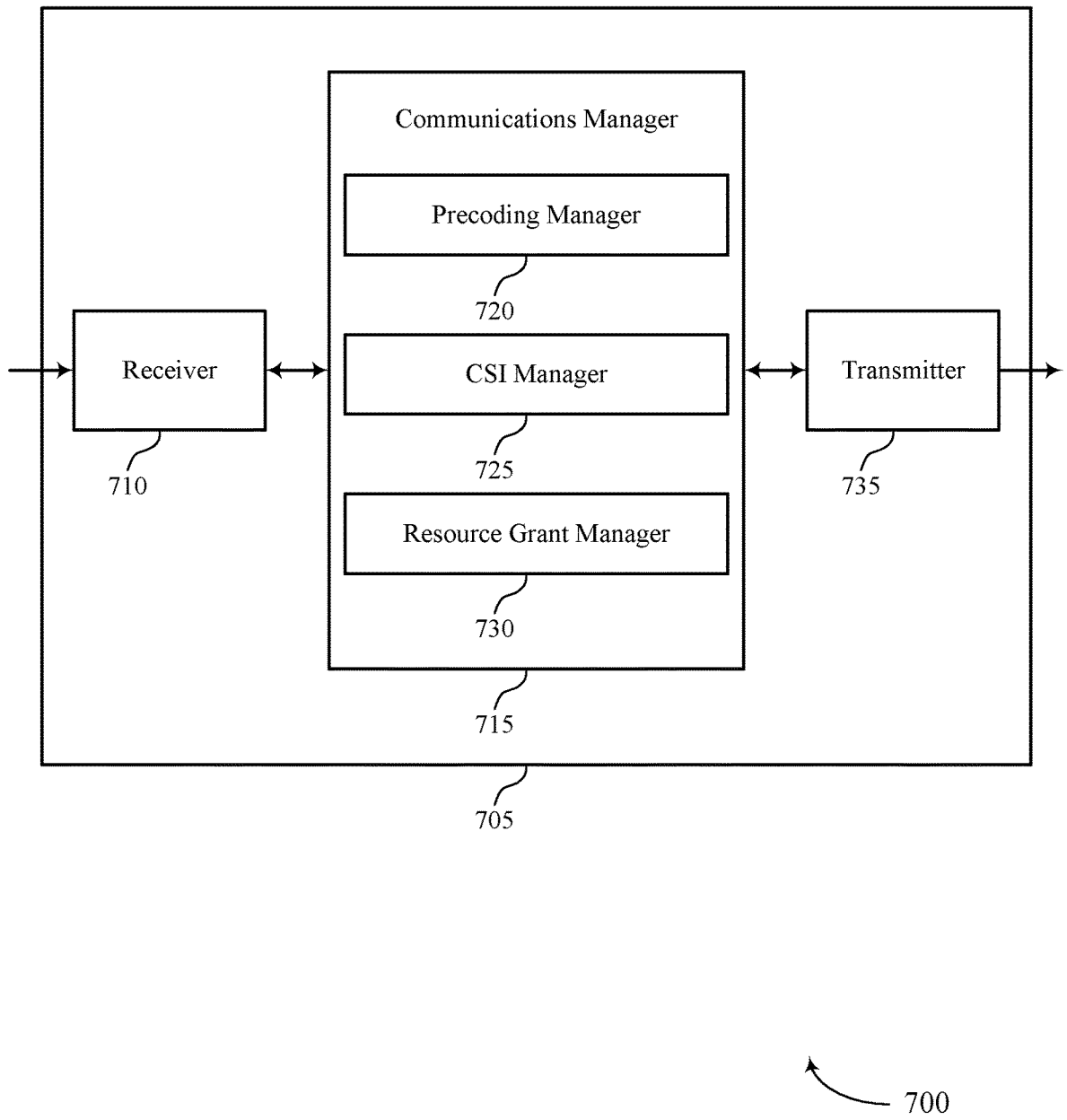

FIG. 7 shows a block diagram 700 of a device 705 that supports channel state information reporting techniques for full-duplex user equipment in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to channel state information reporting techniques for full-duplex user equipment, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a precoding manager 720, a CSI manager 725, and a resource grant manager 730. The communications manager 715 may be an example of aspects of the communications manager 910 described herein.

The precoding manager 720 may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions.

The CSI manager 725 may determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal and transmit the channel state information report to the base station.

In some cases, the precoding manager 720 may determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions and select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators. The CSI manager 725 may transmit, to the base station, a channel state information report indicating at least the downlink precoding matrix indicator and the subset of uplink precoding matrix indicators. The resource grant manager 730 may receive, from the base station, an indication of which of the subset of uplink precoding matrix indicators are to be used for the uplink transmissions.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
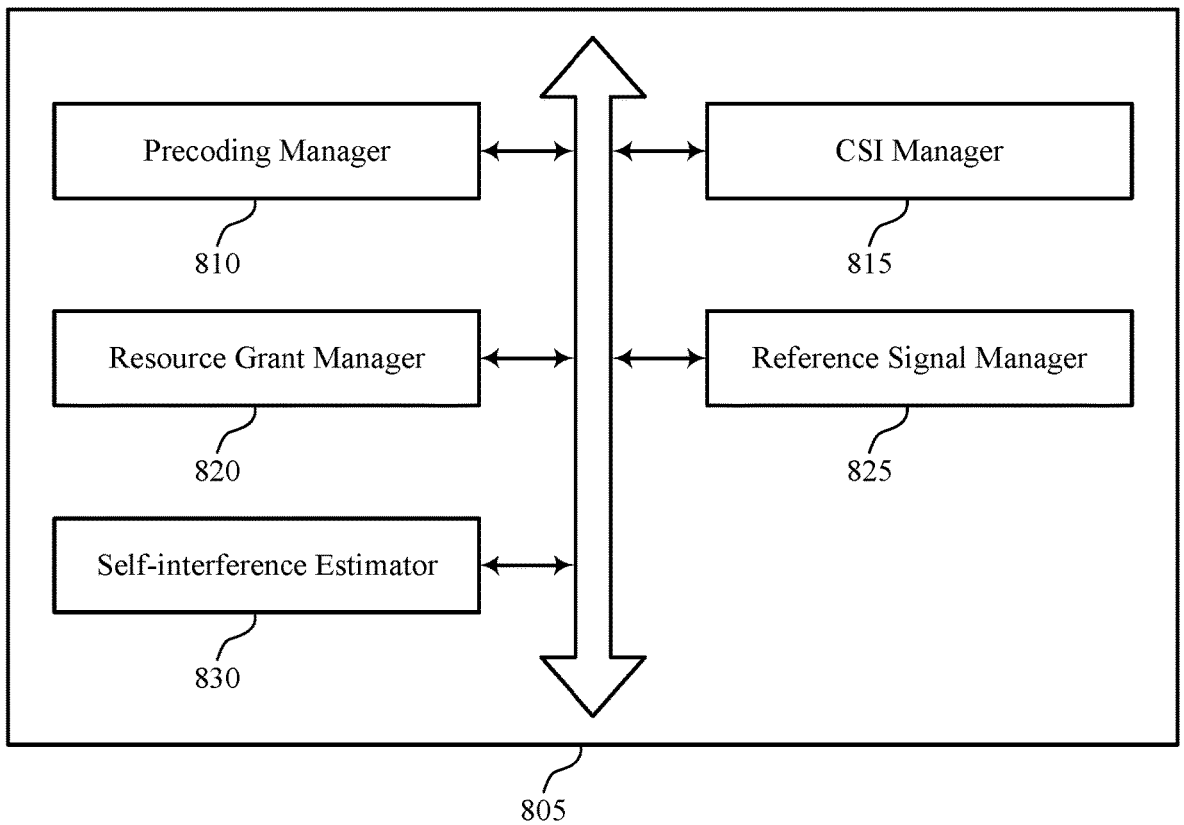
FIG. 8 shows a block diagram of a communications manager that supports channel state information reporting techniques for full-duplex user equipment in accordance with aspects of the present disclosure.

FIG. 8 shows a block diagram 800 of a communications manager 805 that supports channel state information reporting techniques for full-duplex user equipment in accordance with aspects of the present disclosure. The communications manager 805 may be an example of aspects of a communications manager 615, a communications manager 715, or a communications manager 910 described herein. The communications manager 805 may include a precoding manager 810, a CSI manager 815, a resource grant manager 820, a reference signal manager 825, and a self-interference estimator 830. Each of these modules may communicate, directly or indirectly, with one another (e.g., via one or more buses).

The precoding manager 810 may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions.

In some examples, the precoding manager 810 may determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. In some examples, the precoding manager 810 may select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators.

In some cases, the uplink precoding matrix indicator from the base station identifies an index of an uplink precoding matrix that belongs to a set of preconfigured uplink precoding matrixes. In some cases, the uplink precoding matrix indicator from the base station includes a set of uplink precoding matrix indicator values that are associated with one or more time slots, one or more frequency bands, or combinations thereof. In some cases, the first set of receive antennas and the second set of transmit antennas correspond to a same set of antennas at the UE, or correspond to different sets of antennas at the UE. In some cases, the uplink precoding matrix indicator from the base station identifies an index of an uplink precoding matrix that belongs to a set of preconfigured uplink precoding matrixes.

In some cases, the subset of uplink precoding matrix indicators correspond to a preferable or unpreferable subset of the set of available uplink precoding matrix indicators based on the one or more measurements of the downlink reference signal and the determined downlink precoding matrix indicator. In some cases, the downlink precoding matrix indicator is determined prior to the selecting the subset of uplink precoding matrix indicators. In some cases, the downlink precoding matrix indicator is determined concurrently with the selecting the subset of uplink precoding matrix indicators. In some cases, the subset of uplink precoding matrix indicators are provided in a codepoint or a bitmap.

In some cases, the indication of which of the subset of uplink precoding matrix indicators are to be used for the uplink transmissions is determined based on a channel quality of an uplink reference signal transmitted to the base station. In some cases, the first set of receive antennas and the second set of transmit antennas correspond to a same set of antennas at the UE, or correspond to different sets of antennas at the UE.

The CSI manager 815 may determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal. In some examples, the CSI manager 815 may transmit the channel state information report to the base station.

In some examples, the CSI manager 815 may transmit, to the base station, a channel state information report indicating at least the downlink precoding matrix indicator and the subset of uplink precoding matrix indicators.

In some cases, the uplink precoding matrix indicator is provided in a channel state information report configuration. In some cases, the channel state information report configuration is an aperiodic channel state information report configuration provided in a medium access control (MAC) control element or downlink control information.

In some cases, the channel state information report further includes one or more of a rank indicator or a channel quality indicator. In some cases, the channel state information report is a periodic, semi-persistent or aperiodic report.

The resource grant manager 820 may receive, from the base station, an indication of which of the subset of uplink precoding matrix indicators are to be used for the uplink transmissions.

In some examples, the resource grant manager 820 may receive, from the base station, downlink grant information and uplink grant information for downlink communications and uplink communications that at least partially overlap in time and frequency, where the downlink grant information indicates a downlink transport format that is based on the channel state information report.

In some examples, the resource grant manager 820 may communicate with the base station in a full-duplex mode with concurrent uplink and downlink communications that at least partially overlap in frequency based on the downlink grant information and the uplink grant information.

In some examples, the resource grant manager 820 may receive, from the base station, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report.

In some examples, the resource grant manager 820 may communicate with the base station in a full-duplex mode with concurrent uplink and downlink communications that at least partially overlap in frequency based on the downlink grant information and the uplink grant information.

The reference signal manager 825 may transmit a precoded uplink reference signal to the base station, and where the uplink precoding matrix indicator corresponds to a precoding matrix applied to the precoded uplink reference signal.

In some examples, the reference signal manager 825 may transmit a set of precoded uplink reference signals using a set of different reference signal resources, where each reference signal resource is associated with a different uplink precoding matrix, and where the uplink precoding matrix indicator from the base station identifies a selected reference signal resource.

In some cases, the downlink reference signal is a channel state information reference signal (CSI-RS) and the uplink reference signal is a SRS.

The self-interference estimator 830 may measure a downlink channel status of a first set of receive antennas for the downlink reference signal to generate a downlink signal matrix. In some examples, the self-interference estimator 830 may add the self-interference estimate to the downlink signal matrix to determine a full-duplex mode downlink signal matrix. In some examples, the self-interference estimator 830 may generate the channel state information report based on the full-duplex mode downlink signal matrix.

In some examples, the self-interference estimator 830 may identify a self-interference based on the first set of receive antennas, a second set of transmit antennas, and the uplink precoding matrix indicator. In some examples, the self-interference estimator 830 may mitigate the self-interference over the downlink signal matrix based on the identified self-interference. In some examples, the self-interference estimator 830 may determine a full-duplex mode downlink signal matrix based at least in part on the mitigated self-interference.

In some examples, the self-interference estimator 830 may calculate a self-interference matrix based on the first set of receive antennas, a second set of transmit antennas, and the uplink precoding matrix indicator. In some examples, the self-interference estimator 830 may project the downlink signal matrix into a null subspace of the self-interference matrix or whitening a composite interference-plus-noise matrix that corresponds to an added self-interference matrix and the downlink signal matrix.

In some examples, the self-interference estimator 830 may measure a downlink channel status of a first set of receive antennas for the downlink reference signal to generate a downlink signal matrix. In some examples, the self-interference estimator 830 may estimate a first self-interference matrix based on a first uplink precoding matrix indicator that is associated with a second set of transmit antennas.

In some examples, the self-interference estimator 830 may determine that a channel quality associated with the downlink signal matrix and the first self-interference matrix exceeds a threshold value. In some examples, the self-interference estimator 830 may determine one or more equivalent self-interference matrices to the first self-interference matrix, and where the subset of uplink precoding matrix indicators are associated with the one or more equivalent self-interference matrices. In some cases, the self-interference is identified from a set of predetermined self-interference matrices that are associated with different combinations of the first set of receive antennas, the second set of transmit antennas, and uplink precoding matrix indicators.

Figure 9:
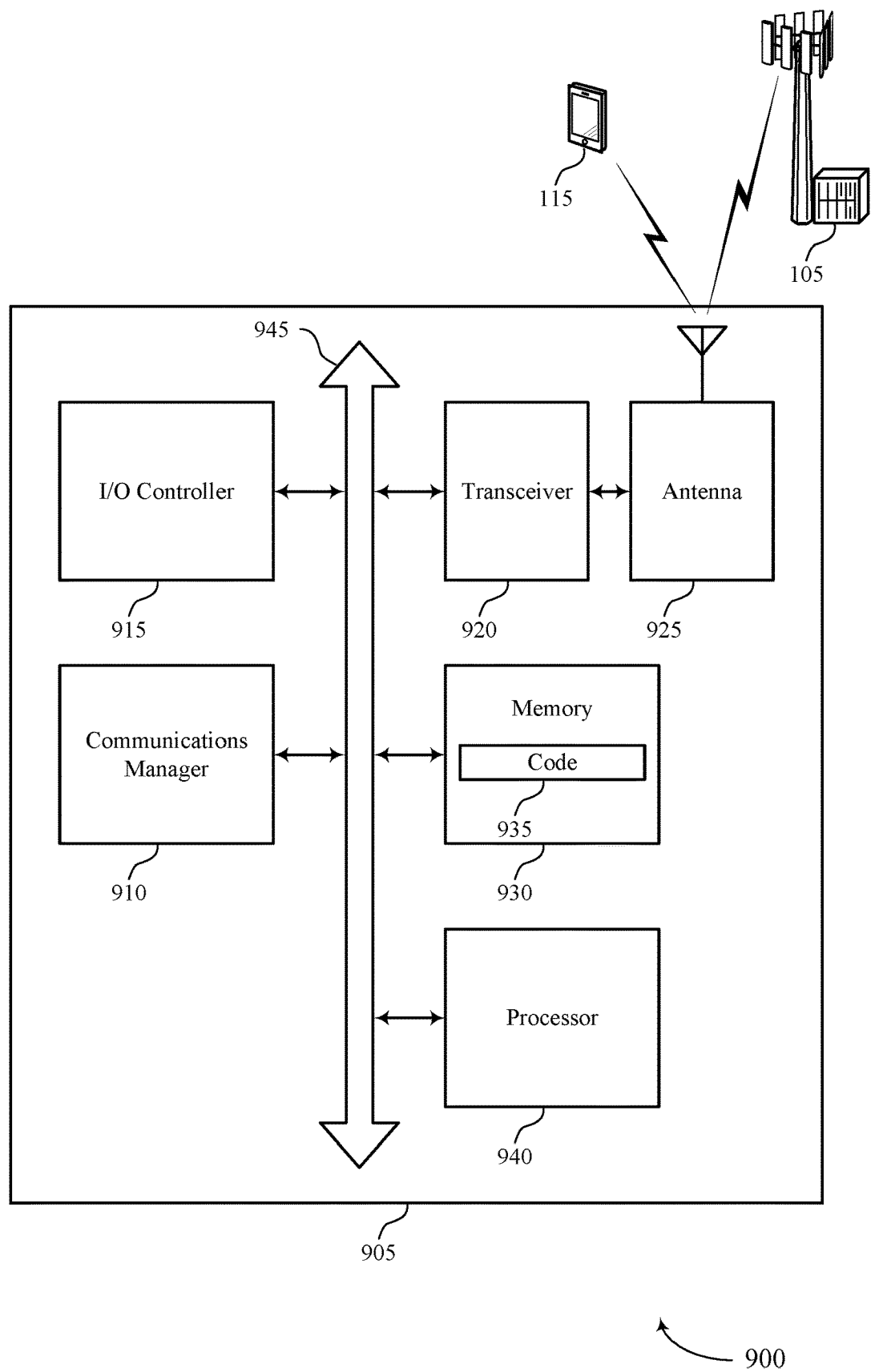
FIG. 9 shows a diagram of a system including a device that supports channel state information reporting techniques for full-duplex user equipment in accordance with aspects of the present disclosure.

FIG. 9 shows a diagram of a system 900 including a device 905 that supports channel state information reporting techniques for full-duplex user equipment in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal, and transmit the channel state information report to the base station.

The communications manager 910 may also determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators, transmit, to the base station, a channel state information report indicating at least the downlink precoding matrix indicator and the subset of uplink precoding matrix indicators, and receive, from the base station, an indication of which of the subset of uplink precoding matrix indicators are to be used for the uplink transmissions.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting channel state information reporting techniques for full-duplex user equipment).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
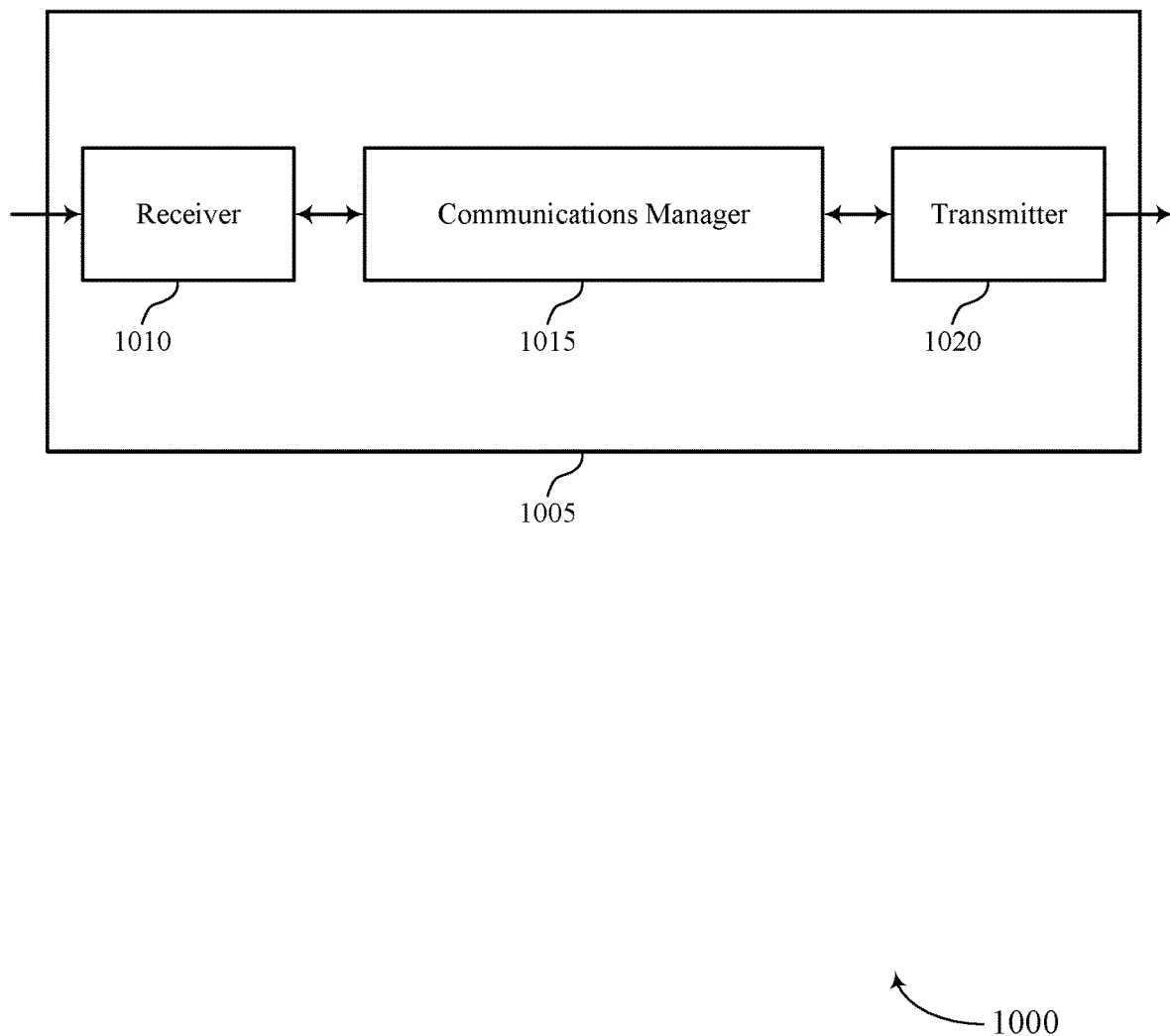
FIGS. 10 and 11 show block diagrams of devices that support channel state information reporting techniques for full-duplex user equipment in accordance with aspects of the present disclosure.

FIG. 10 shows a block diagram 1000 of a device 1005 that supports channel state information reporting techniques for full-duplex user equipment in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state information reporting techniques for full-duplex user equipment, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmit, to the UE, the uplink precoding matrix indicator and a downlink reference signal, receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determine a downlink transport format for the one or more downlink transmissions to be concurrently transmitted with the one or more uplink transmissions, based on the channel state information report.

The communications manager 1015 may also transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, determine, based on an uplink reference signal received from the UE, that a first uplink precoding matrix indicator of the subset of uplink precoding matrix indicators is to be used for the uplink transmissions, receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, and transmit, to the UE, an indication of the first uplink precoding matrix indicator. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
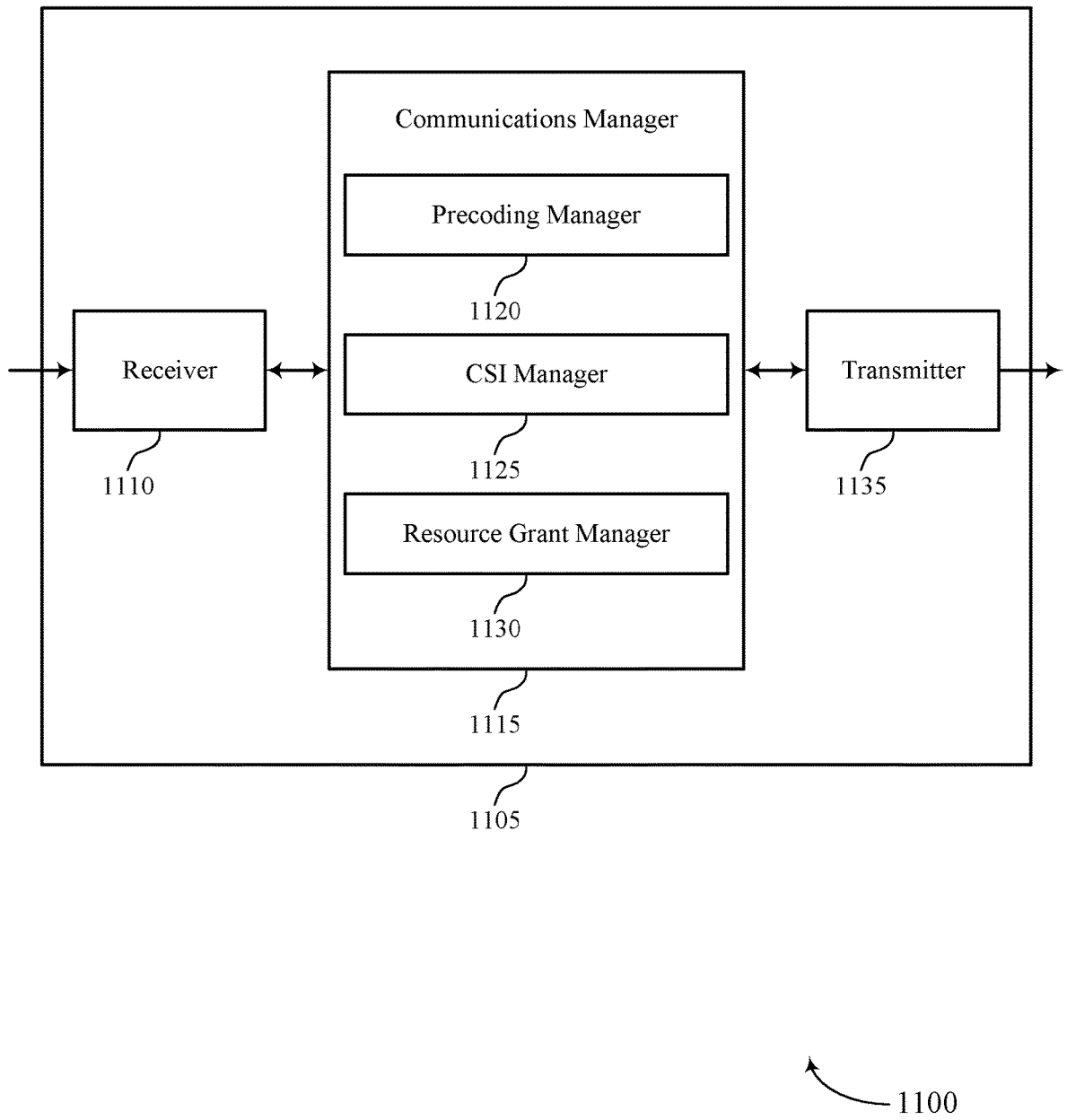

FIG. 11 shows a block diagram 1100 of a device 1105 that supports channel state information reporting techniques for full-duplex user equipment in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to channel state information reporting techniques for full-duplex user equipment, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a precoding manager 1120, a CSI manager 1125, and a resource grant manager 1130. The communications manager 1115 may be an example of aspects of the communications manager 1310 described herein.

The precoding manager 1120 may determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions and transmit, to the UE, the uplink precoding matrix indicator and a downlink reference signal.

The CSI manager 1125 may receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal.

The resource grant manager 1130 may determine a downlink transport format for the one or more downlink transmissions to be concurrently transmitted with the one or more uplink transmissions, based on the channel state information report.

In some cases, the precoding manager 1120 may transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions and determine, based on an uplink reference signal received from the UE, that a first uplink precoding matrix indicator of the subset of uplink precoding matrix indicators is to be used for the uplink transmissions. The CSI manager 1125 may receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator. The resource grant manager 1130 may transmit, to the UE, an indication of the first uplink precoding matrix indicator.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
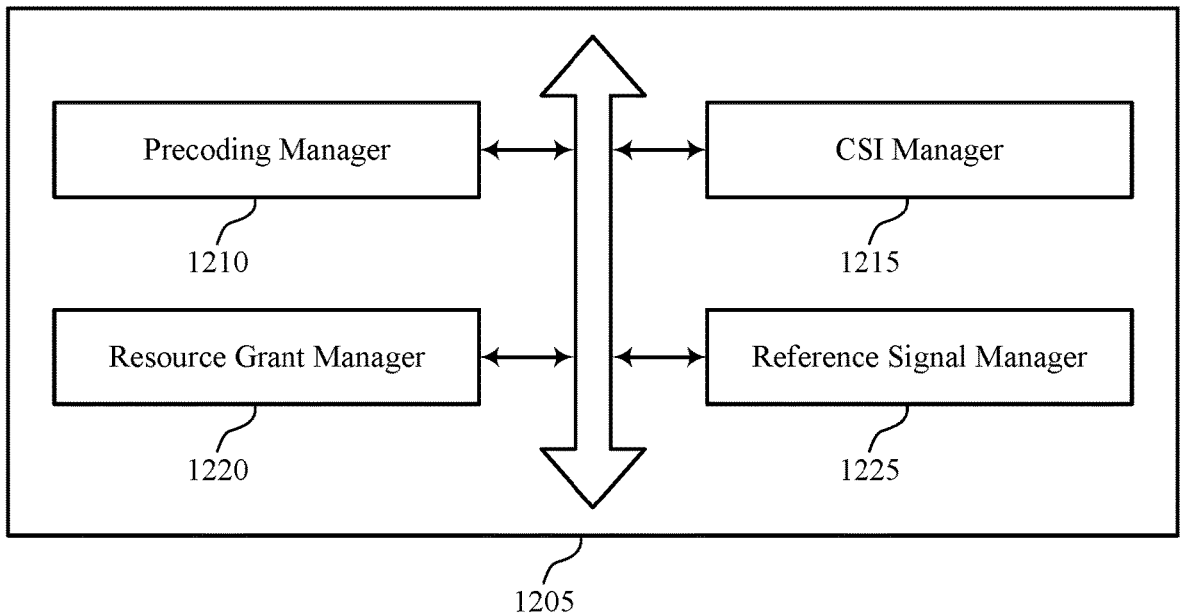
FIG. 12 shows a block diagram of a communications manager that supports channel state information reporting techniques for full-duplex user equipment in accordance with aspects of the present disclosure.

FIG. 12 shows a block diagram 1200 of a communications manager 1205 that supports channel state information reporting techniques for full-duplex user equipment in accordance with aspects of the present disclosure. The communications manager 1205 may be an example of aspects of a communications manager 1015, a communications manager 1115, or a communications manager 1310 described herein. The communications manager 1205 may include a precoding manager 1210, a CSI manager 1215, a resource grant manager 1220, and a reference signal manager 1225. Each of these modules may communicate, directly or indirectly, with one another (e.g., via one or more buses).

The precoding manager 1210 may determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions. In some examples, the precoding manager 1210 may transmit, to the UE, the uplink precoding matrix indicator and a downlink reference signal.

In some examples, the precoding manager 1210 may transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions.

In some examples, the precoding manager 1210 may determine, based on an uplink reference signal received from the UE, that a first uplink precoding matrix indicator of the subset of uplink precoding matrix indicators is to be used for the uplink transmissions.

In some examples, the precoding manager 1210 may derive an uplink channel response matrix of the UE based on one or more measurements of the uplink reference signal. In some examples, the precoding manager 1210 may select an index of an uplink precoding codeword that corresponds to the uplink channel response matrix, where the index is provided by the uplink precoding matrix indicator. In some examples, the precoding manager 1210 may determine a downlink transport format and the first uplink precoding matrix indicator based on a magnitude of the determined receive signal strengths. In some examples, the precoding manager 1210 may determine the first uplink precoding matrix indicator based on the reference signal resource associated with the first precoded uplink reference signal.

In some cases, the uplink precoding matrix indicator corresponds to a precoding matrix applied to a precoded uplink reference signal received from the UE. In some cases, the uplink precoding matrix indicator from the base station identifies an index of an uplink precoding matrix that belongs to a set of preconfigured uplink precoding matrixes. In some cases, the uplink precoding matrix indicator includes a set of uplink precoding matrix indicator values that are associated with one or more time slots, one or more frequency bands, or combinations thereof. In some cases, the uplink precoding matrix indicator identifies an index of an uplink precoding matrix that belongs to a set of preconfigured uplink precoding matrixes.

In some cases, the subset of uplink precoding matrix indicators correspond to a preferable or unpreferable subset of the set of available uplink precoding matrix indicators, and where the base station excludes the unpreferable subset of uplink precoding matrix indicators from the set of available uplink precoding matrix indicators when determining the first uplink precoding matrix indicator. In some cases, the subset of uplink precoding matrix indicators are provided in a codepoint or a bitmap.

The CSI manager 1215 may receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal.

In some examples, the CSI manager 1215 may receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator.

In some examples, the CSI manager 1215 may multiply each codeword in the subset of uplink precoding matrix indicators with an uplink channel matrix to generate a set of equivalent uplink channel matrices that correspond with the subset of uplink precoding matrix indicators.

In some examples, the CSI manager 1215 may determine a receive signal strength for each of the set of equivalent uplink channel matrices.

In some cases, the uplink precoding matrix indicator is provided in a channel state information report configuration. In some cases, the channel state information report configuration is an aperiodic channel state information report configuration provided in a medium access control (MAC) control element or downlink control information. In some cases, the first uplink precoding matrix indicator is determined based on one or more of a highest received signal strength, an indicated signal strength of the downlink reference signal at the UE that is provided in the channel state information report, or any combinations thereof. In some cases, the channel state information report further includes one or more of a rank indicator or a channel quality indicator. In some cases, the channel state information report is a periodic, semi-persistent or aperiodic report.

The resource grant manager 1220 may determine a downlink transport format for the one or more downlink transmissions to be concurrently transmitted with the one or more uplink transmissions, based on the channel state information report.

In some examples, the resource grant manager 1220 may transmit, to the UE, an indication of the first uplink precoding matrix indicator.

In some examples, the resource grant manager 1220 may transmit, to the UE, downlink grant information and uplink grant information for downlink communications and uplink communications that at least partially overlap in time and frequency, where the downlink grant information indicates the downlink transport format.

In some examples, the resource grant manager 1220 may communicate with the UE in a full-duplex mode with concurrent uplink and downlink communications that at least partially overlap in frequency based on the downlink grant information and the uplink grant information.

In some examples, the resource grant manager 1220 may transmit, to the UE, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report.

In some examples, the resource grant manager 1220 may communicate with the UE in a full-duplex mode with concurrent uplink and downlink communications that at least partially overlap in frequency based on the downlink grant information and the uplink grant information.

The reference signal manager 1225 may receive, from the UE, a set of precoded uplink reference signals using a set of different reference signal resources, where each reference signal resource is associated with a different uplink precoding matrix, and where the uplink precoding matrix indicator identifies a selected reference signal resource. In some examples, the reference signal manager 1225 may identify a first precoded uplink reference signal of the set of precoded uplink reference signals that has a highest signal quality. In some examples, the reference signal manager 1225 may determine the reference signal resource associated with the first precoded uplink reference signal.

In some examples, the reference signal manager 1225 may receive a precoded uplink reference signal from the UE, where the uplink precoding matrix indicator corresponds to a precoding matrix applied to the uplink reference signal. In some examples, the reference signal manager 1225 may receive, from the UE, a set of precoded uplink reference signals using a set of different reference signal resources, where each reference signal resource is associated with a different uplink precoding matrix of the subset of uplink precoding matrix indicators. In some examples, the reference signal manager 1225 may identify a first precoded uplink reference signal of the set of precoded uplink reference signals based on a receive signal strength of each of the set of precoded uplink reference signals. In some cases, the downlink reference signal is a channel state information reference signal (CSI-RS) and the uplink reference signal is a SRS.

Figure 13:
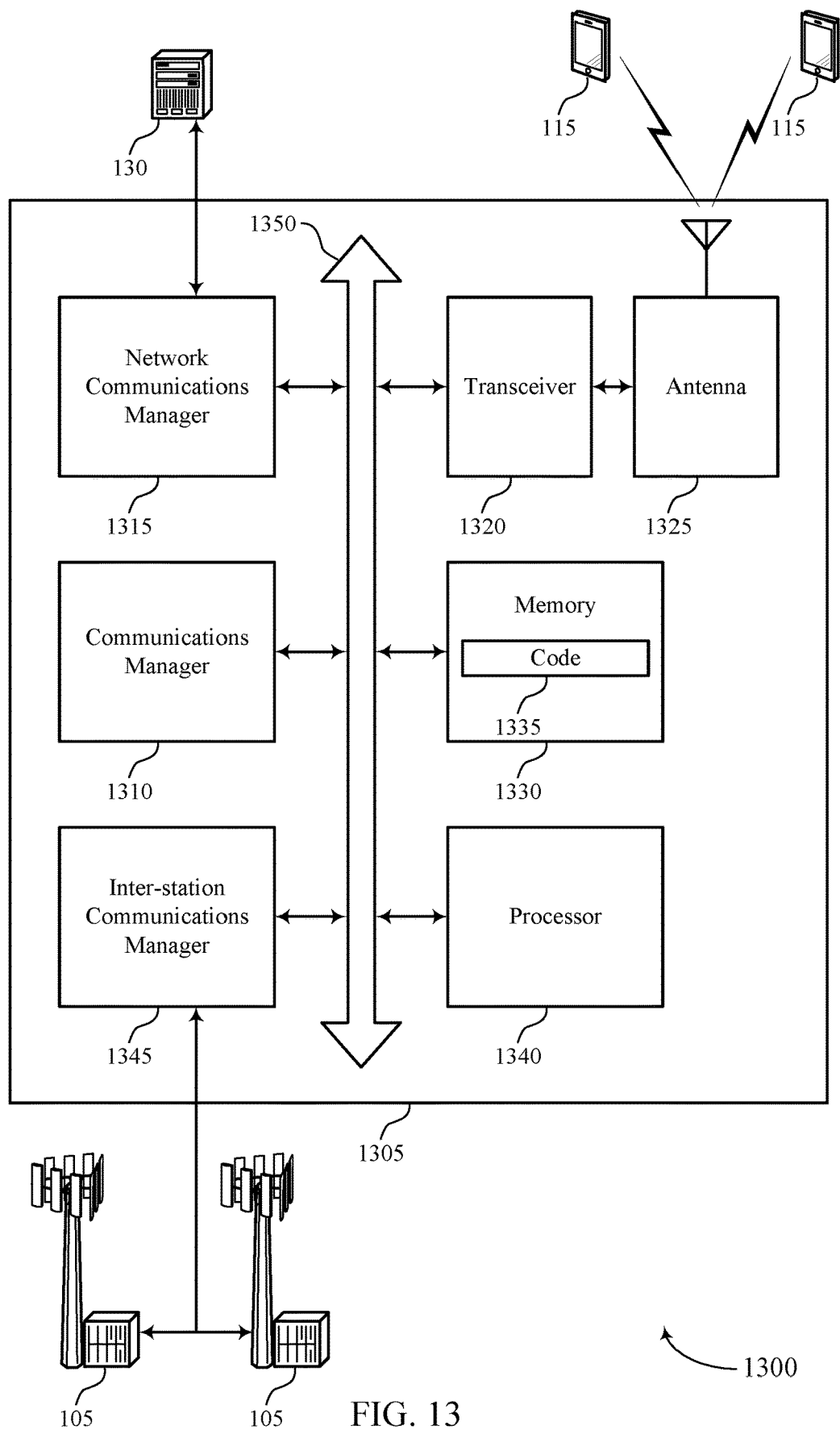
FIG. 13 shows a diagram of a system including a device that supports channel state information reporting techniques for full-duplex user equipment in accordance with aspects of the present disclosure.

FIG. 13 shows a diagram of a system 1300 including a device 1305 that supports channel state information reporting techniques for full-duplex user equipment in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions, transmit, to the UE, the uplink precoding matrix indicator and a downlink reference signal, receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal, and determine a downlink transport format for the one or more downlink transmissions to be concurrently transmitted with the one or more uplink transmissions, based on the channel state information report.

The communications manager 1310 may also transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions, determine, based on an uplink reference signal received from the UE, that a first uplink precoding matrix indicator of the subset of uplink precoding matrix indicators is to be used for the uplink transmissions, receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator, and transmit, to the UE, an indication of the first uplink precoding matrix indicator.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting channel state information reporting techniques for full-duplex user equipment).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
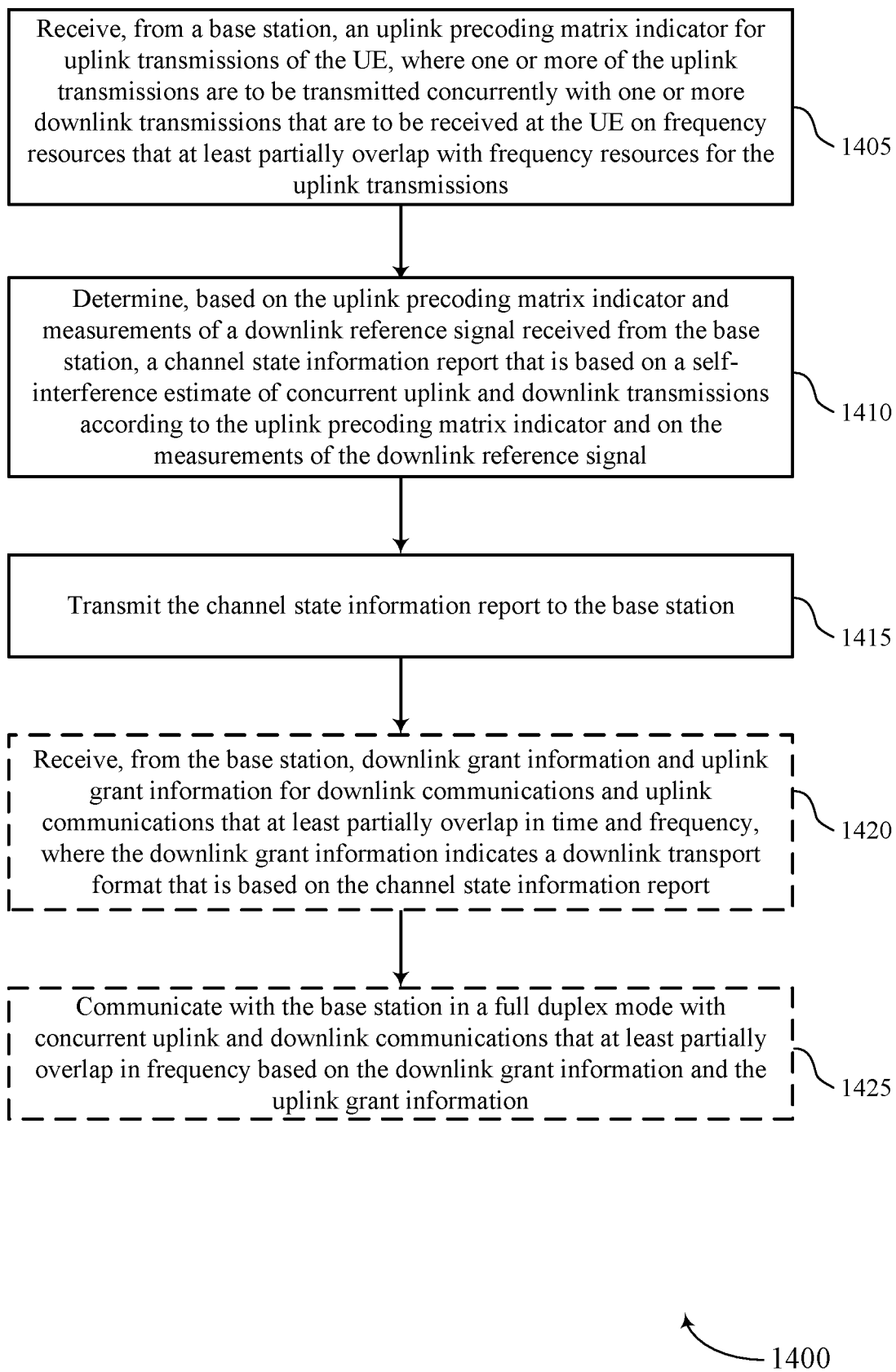
FIGS. 14 through 22 show flowcharts illustrating methods that support channel state information reporting techniques for full-duplex user equipment in accordance with aspects of the present disclosure.

FIG. 14 shows a flowchart illustrating a method 1400 that supports channel state information reporting techniques for full-duplex user equipment in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions. The operations of 1405 may be performed according to the methods described herein. In some examples, aspects of the operations of 1405 may be performed by a precoding manager as described with reference to FIGS. 6 through 9. In some cases, the uplink precoding matrix indicator from the base station identifies an index of an uplink precoding matrix that belongs to a set of preconfigured uplink precoding matrixes.

At 1410, the UE may determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal. The operations of 1410 may be performed according to the methods described herein. In some examples, aspects of the operations of 1410 may be performed by a CSI manager as described with reference to FIGS. 6 through 9.

At 1415, the UE may transmit the channel state information report to the base station. The operations of 1415 may be performed according to the methods described herein. In some examples, aspects of the operations of 1415 may be performed by a CSI manager as described with reference to FIGS. 6 through 9.

Optionally, at 1420, the UE may receive, from the base station, downlink grant information and uplink grant information for downlink communications and uplink communications that at least partially overlap in time and frequency, where the downlink grant information indicates a downlink transport format that is based on the channel state information report. The operations of 1420 may be performed according to the methods described herein. In some examples, aspects of the operations of 1420 may be performed by a resource grant manager as described with reference to FIGS. 6 through 9.

Optionally, at 1425, the UE may communicate with the base station in a full-duplex mode with concurrent uplink and downlink communications that at least partially overlap in frequency based on the downlink grant information and the uplink grant information. The operations of 1425 may be performed according to the methods described herein. In some examples, aspects of the operations of 1425 may be performed by a resource grant manager as described with reference to FIGS. 6 through 9.

Figure 15:
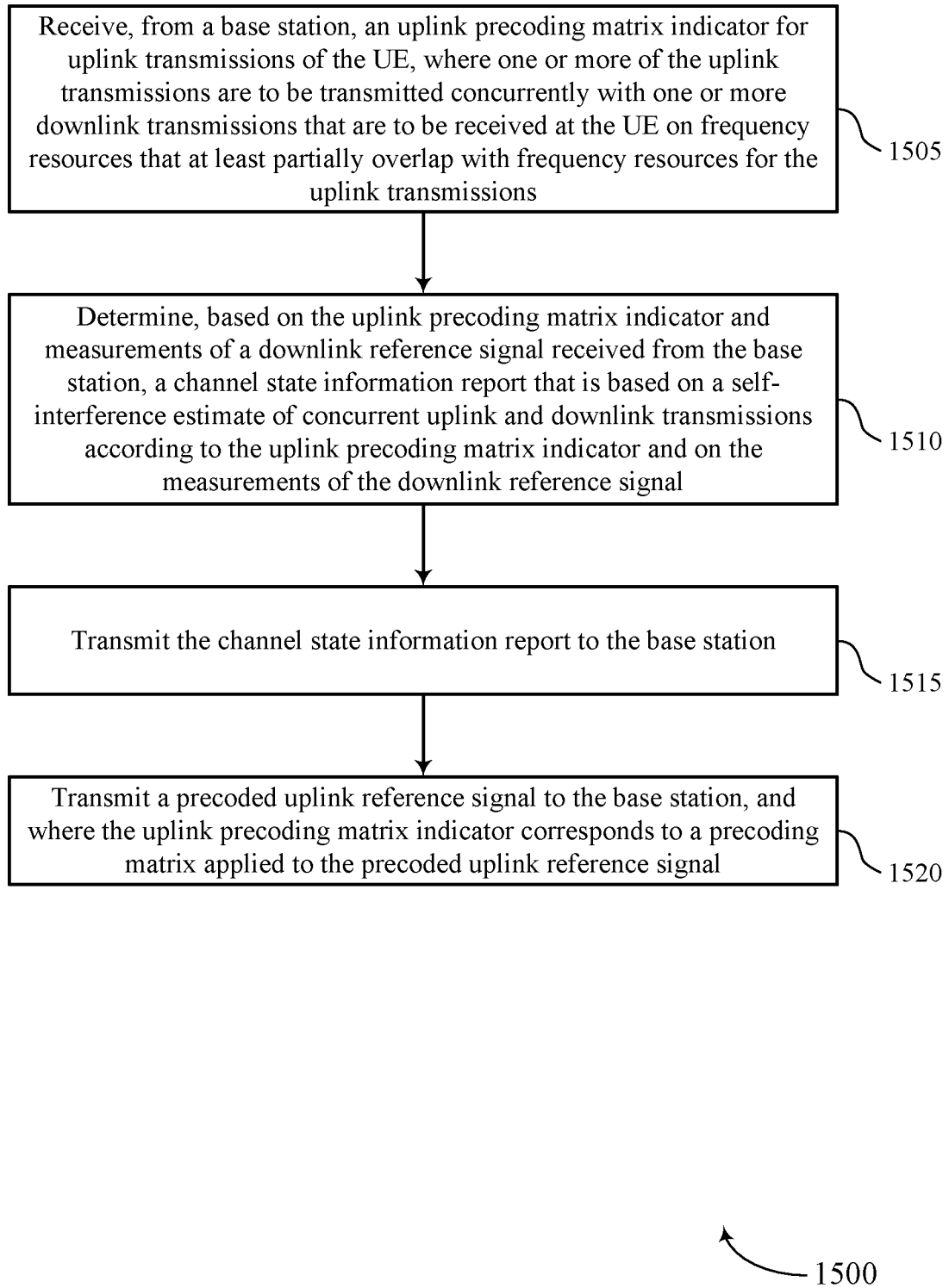

FIG. 15 shows a flowchart illustrating a method 1500 that supports channel state information reporting techniques for full-duplex user equipment in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions. The operations of 1505 may be performed according to the methods described herein. In some examples, aspects of the operations of 1505 may be performed by a precoding manager as described with reference to FIGS. 6 through 9.

At 1510, the UE may determine, based on the uplink precoding matrix indicator and measurements of a downlink reference signal received from the base station, a channel state information report that is based on a self-interference estimate of concurrent uplink and downlink transmissions according to the uplink precoding matrix indicator and on the measurements of the downlink reference signal. The operations of 1510 may be performed according to the methods described herein. In some examples, aspects of the operations of 1510 may be performed by a CSI manager as described with reference to FIGS. 6 through 9.

At 1515, the UE may transmit the channel state information report to the base station. The operations of 1515 may be performed according to the methods described herein. In some examples, aspects of the operations of 1515 may be performed by a CSI manager as described with reference to FIGS. 6 through 9.

At 1520, the UE may transmit a precoded uplink reference signal to the base station, and where the uplink precoding matrix indicator corresponds to a precoding matrix applied to the precoded uplink reference signal. The operations of 1520 may be performed according to the methods described herein. In some examples, aspects of the operations of 1520 may be performed by a reference signal manager as described with reference to FIGS. 6 through 9. In some cases, the UE may transmit a set of precoded uplink reference signals using a set of different reference signal resources, where each reference signal resource is associated with a different uplink precoding matrix, and where the uplink precoding matrix indicator from the base station identifies a selected reference signal resource. In some cases, the downlink reference signal is a CSI-RS and the uplink reference signal is a SRS. The operations of 1530 may be performed according to the methods described herein.

Figure 16:
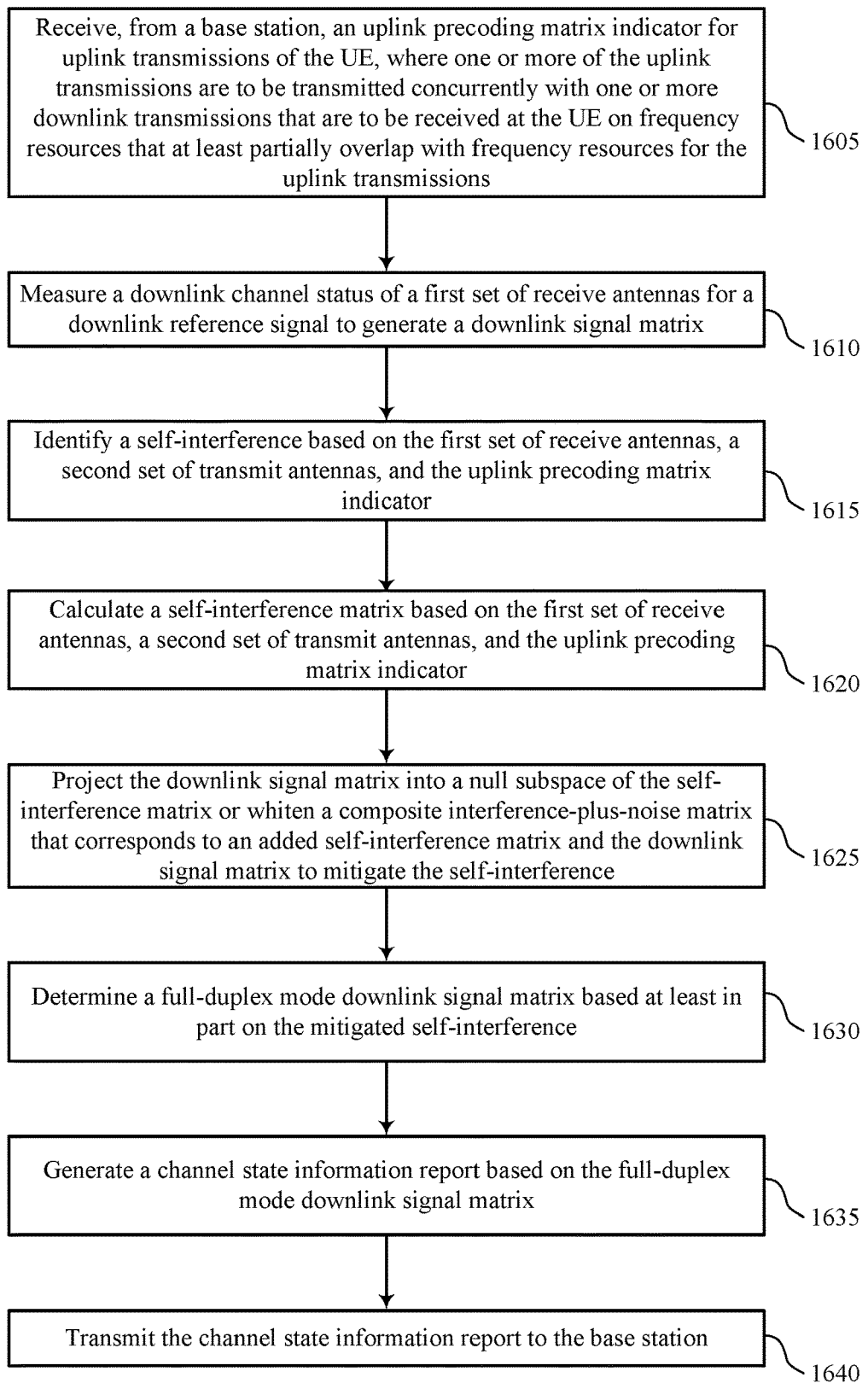

FIG. 16 shows a flowchart illustrating a method 1600 that supports channel state information reporting techniques for full-duplex user equipment in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions. The operations of 1605 may be performed according to the methods described herein. In some examples, aspects of the operations of 1605 may be performed by a precoding manager as described with reference to FIGS. 6 through 9.

At 1610, the UE may measure a downlink channel status of a first set of receive antennas for a downlink reference signal to generate a downlink signal matrix. The operations of 1610 may be performed according to the methods described herein. In some examples, aspects of the operations of 1610 may be performed by a self-interference estimator as described with reference to FIGS. 6 through 9.

At 1615, the UE may identify a self-interference based on the first set of receive antennas, a second set of transmit antennas, and the uplink precoding matrix indicator. The operations of 1615 may be performed according to the methods described herein. In some examples, aspects of the operations of 1615 may be performed by a self-interference estimator as described with reference to FIGS. 6 through 9.

At 1620, the UE may calculate a self-interference matrix based on the first set of receive antennas, a second set of transmit antennas, and the uplink precoding matrix indicator. The operations of 1620 may be performed according to the methods described herein. In some examples, aspects of the operations of 1620 may be performed by a self-interference estimator as described with reference to FIGS. 6 through 9.

At 1625, the UE may project the downlink signal matrix into a null subspace of the self-interference matrix or whiten a composite interference-plus-noise matrix that corresponds to an added self-interference matrix and the downlink signal matrix to mitigate self-interference. The operations of 1625 may be performed according to the methods described herein. In some examples, aspects of the operations of 1625 may be performed by a self-interference estimator as described with reference to FIGS. 6 through 9.

At 1630, the UE may determine a full-duplex mode downlink signal matrix based at least in part on the mitigated self-interference. The operations of 1630 may be performed according to the methods described herein. In some examples, aspects of the operations of 1630 may be performed by a self-interference estimator as described with reference to FIGS. 6 through 9.

At 1635, the UE may generate the channel state information report based on the full-duplex mode downlink signal matrix. The operations of 1635 may be performed according to the methods described herein. In some examples, aspects of the operations of 1635 may be performed by a self-interference estimator as described with reference to FIGS. 6 through 9.

At 1640, the UE may transmit the channel state information report to the base station. The operations of 1640 may be performed according to the methods described herein. In some examples, aspects of the operations of 1640 may be performed by a CSI manager as described with reference to FIGS. 6 through 9.

Figure 17:
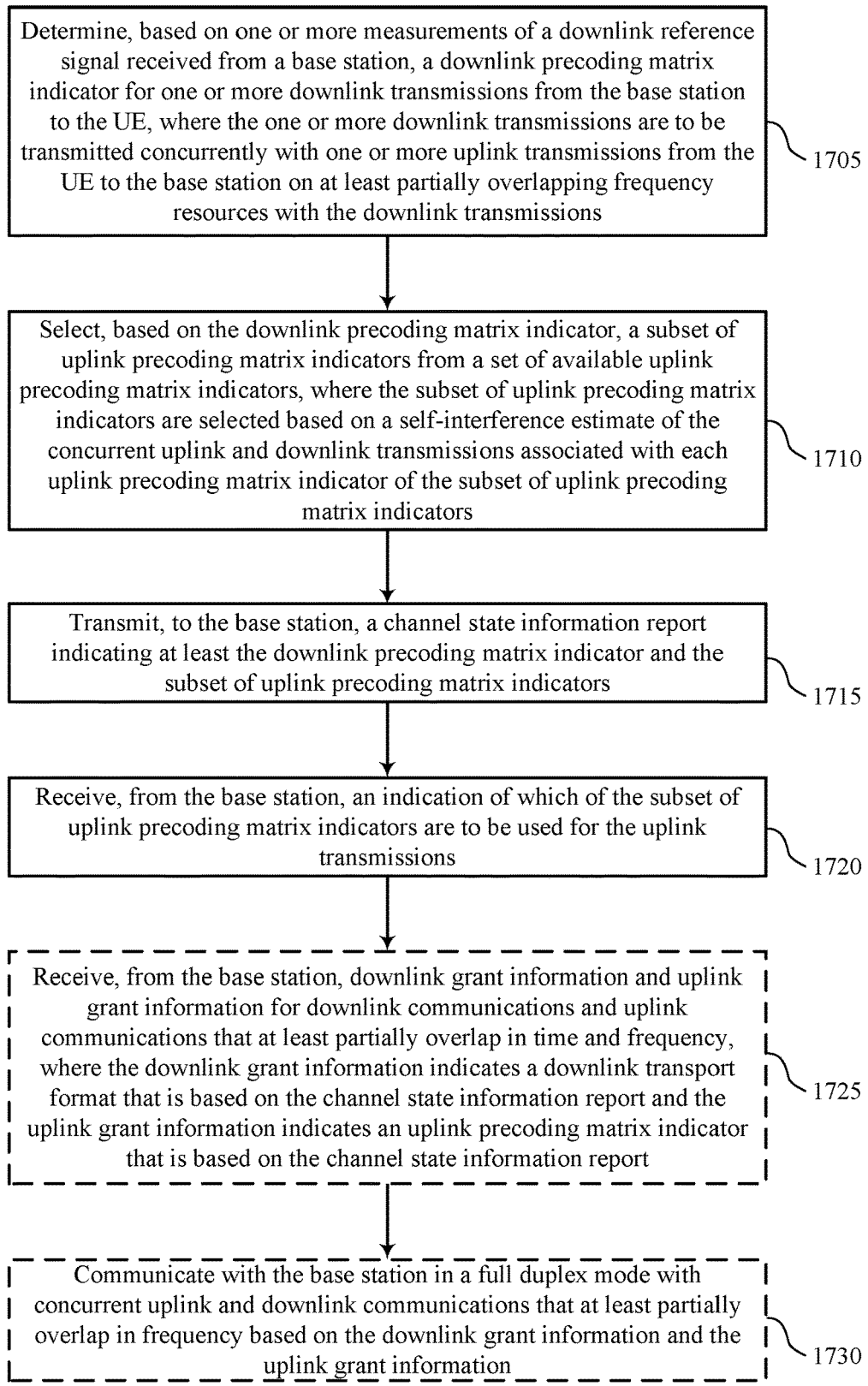

FIG. 17 shows a flowchart illustrating a method 1700 that supports channel state information reporting techniques for full-duplex user equipment in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. The operations of 1705 may be performed according to the methods described herein. In some examples, aspects of the operations of 1705 may be performed by a precoding manager as described with reference to FIGS. 6 through 9.

At 1710, the UE may select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators. The operations of 1710 may be performed according to the methods described herein. In some examples, aspects of the operations of 1710 may be performed by a precoding manager as described with reference to FIGS. 6 through 9. In some cases, the subset of uplink precoding matrix indicators correspond to a preferable or unpreferable subset of the set of available uplink precoding matrix indicators based on the one or more measurements of the downlink reference signal and the determined downlink precoding matrix indicator.

At 1715, the UE may transmit, to the base station, a channel state information report indicating at least the downlink precoding matrix indicator and the subset of uplink precoding matrix indicators. The operations of 1715 may be performed according to the methods described herein. In some examples, aspects of the operations of 1715 may be performed by a CSI manager as described with reference to FIGS. 6 through 9.

At 1720, the UE may receive, from the base station, an indication of which of the subset of uplink precoding matrix indicators are to be used for the uplink transmissions. The operations of 1720 may be performed according to the methods described herein. In some examples, aspects of the operations of 1720 may be performed by a resource grant manager as described with reference to FIGS. 6 through 9.

Optionally, at 1725, the UE may receive, from the base station, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report. The operations of 1725 may be performed according to the methods described herein. In some examples, aspects of the operations of 1725 may be performed by a resource grant manager as described with reference to FIGS. 6 through 9.

Optionally, at 1730, the UE may communicate with the base station in a full-duplex mode with concurrent uplink and downlink communications that at least partially overlap in frequency based on the downlink grant information and the uplink grant information. The operations of 1730 may be performed according to the methods described herein. In some examples, aspects of the operations of 1730 may be performed by a resource grant manager as described with reference to FIGS. 6 through 9.

Figure 18:
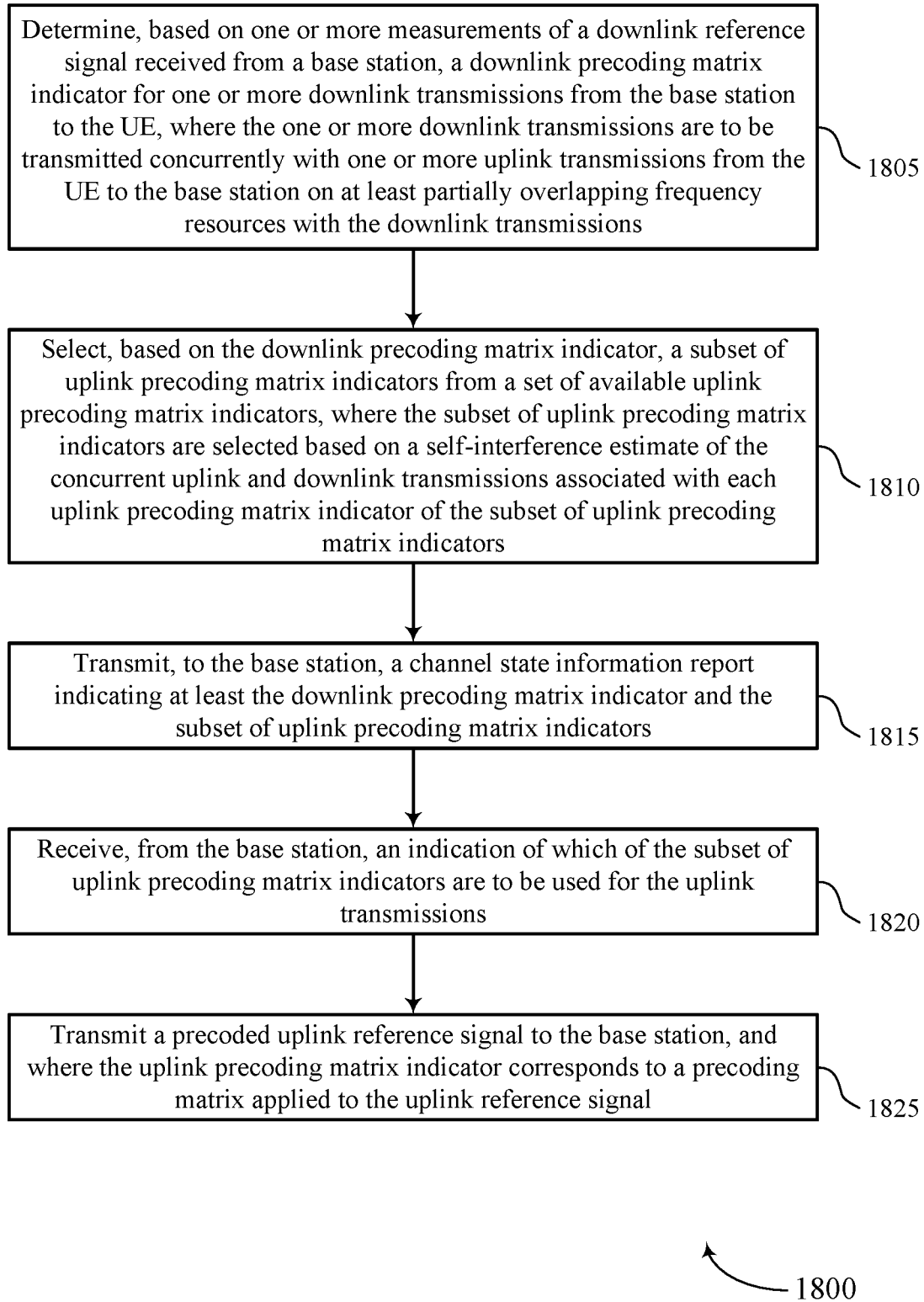

FIG. 18 shows a flowchart illustrating a method 1800 that supports channel state information reporting techniques for full-duplex user equipment in accordance with aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. The operations of 1805 may be performed according to the methods described herein. In some examples, aspects of the operations of 1805 may be performed by a precoding manager as described with reference to FIGS. 6 through 9.

At 1810, the UE may select, based on the downlink precoding matrix indicator, a subset of uplink precoding matrix indicators from a set of available uplink precoding matrix indicators, where the subset of uplink precoding matrix indicators are selected based on a self-interference estimate of the concurrent uplink and downlink transmissions associated with each uplink precoding matrix indicator of the subset of uplink precoding matrix indicators. The operations of 1810 may be performed according to the methods described herein. In some examples, aspects of the operations of 1810 may be performed by a precoding manager as described with reference to FIGS. 6 through 9.

At 1815, the UE may transmit, to the base station, a channel state information report indicating at least the downlink precoding matrix indicator and the subset of uplink precoding matrix indicators. The operations of 1815 may be performed according to the methods described herein. In some examples, aspects of the operations of 1815 may be performed by a CSI manager as described with reference to FIGS. 6 through 9.

At 1820, the UE may receive, from the base station, an indication of which of the subset of uplink precoding matrix indicators are to be used for the uplink transmissions. The operations of 1820 may be performed according to the methods described herein. In some examples, aspects of the operations of 1820 may be performed by a resource grant manager as described with reference to FIGS. 6 through 9.

At 1825, the UE may transmit a precoded uplink reference signal to the base station, and where the uplink precoding matrix indicator corresponds to a precoding matrix applied to the uplink reference signal. The operations of 1825 may be performed according to the methods described herein. In some examples, aspects of the operations of 1825 may be performed by a reference signal manager as described with reference to FIGS. 6 through 9.

Figure 19:
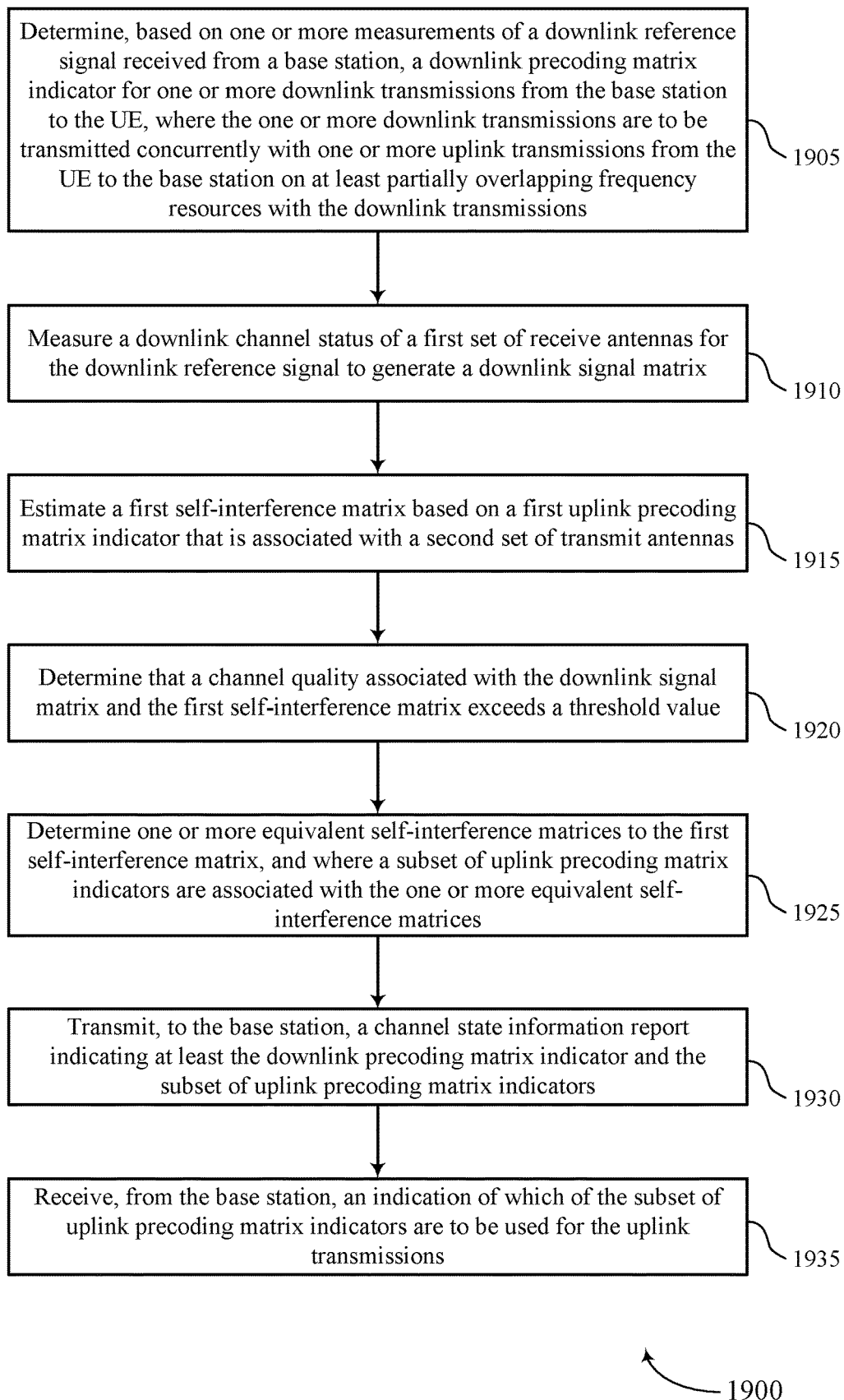

FIG. 19 shows a flowchart illustrating a method 1900 that supports channel state information reporting techniques for full-duplex user equipment in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may determine, based on one or more measurements of a downlink reference signal received from a base station, a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. The operations of 1905 may be performed according to the methods described herein. In some examples, aspects of the operations of 1905 may be performed by a precoding manager as described with reference to FIGS. 6 through 9.

At 1910, the UE may measure a downlink channel status of a first set of receive antennas for the downlink reference signal to generate a downlink signal matrix. The operations of 1910 may be performed according to the methods described herein. In some examples, aspects of the operations of 1910 may be performed by a self-interference estimator as described with reference to FIGS. 6 through 9.

At 1915, the UE may estimate a first self-interference matrix based on a first uplink precoding matrix indicator that is associated with a second set of transmit antennas. The operations of 1915 may be performed according to the methods described herein. In some examples, aspects of the operations of 1915 may be performed by a self-interference estimator as described with reference to FIGS. 6 through 9.

At 1920, the UE may determine that a channel quality associated with the downlink signal matrix and the first self-interference matrix exceeds a threshold value. The operations of 1920 may be performed according to the methods described herein. In some examples, aspects of the operations of 1920 may be performed by a self-interference estimator as described with reference to FIGS. 6 through 9.

At 1925, the UE may determine one or more equivalent self-interference matrices to the first self-interference matrix, and where a subset of uplink precoding matrix indicators are associated with the one or more equivalent self-interference matrices. The operations of 1925 may be performed according to the methods described herein. In some examples, aspects of the operations of 1925 may be performed by a self-interference estimator as described with reference to FIGS. 6 through 9.

At 1930, the UE may transmit, to the base station, a channel state information report indicating at least the downlink precoding matrix indicator and the subset of uplink precoding matrix indicators. The operations of 1930 may be performed according to the methods described herein. In some examples, aspects of the operations of 1930 may be performed by a CSI manager as described with reference to FIGS. 6 through 9.

At 1935, the UE may receive, from the base station, an indication of which of the subset of uplink precoding matrix indicators are to be used for the uplink transmissions. The operations of 1935 may be performed according to the methods described herein. In some examples, aspects of the operations of 1935 may be performed by a resource grant manager as described with reference to FIGS. 6 through 9.

Figure 20:
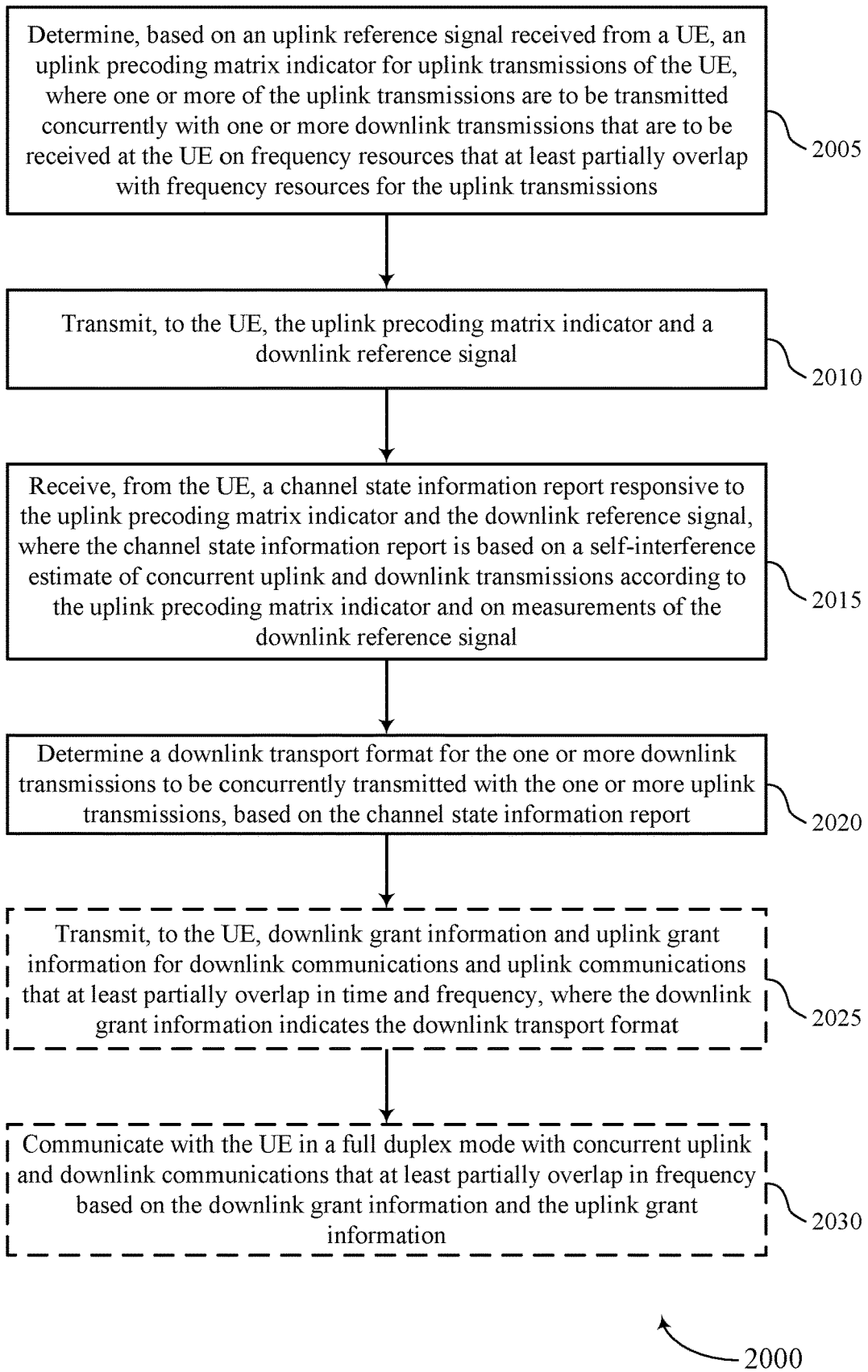

FIG. 20 shows a flowchart illustrating a method 2000 that supports channel state information reporting techniques for full-duplex user equipment in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may determine, based on an uplink reference signal received from a UE, an uplink precoding matrix indicator for uplink transmissions of the UE, where one or more of the uplink transmissions are to be transmitted concurrently with one or more downlink transmissions that are to be received at the UE on frequency resources that at least partially overlap with frequency resources for the uplink transmissions. The operations of 2005 may be performed according to the methods described herein. In some examples, aspects of the operations of 2005 may be performed by a precoding manager as described with reference to FIGS. 10 through 13.

At 2010, the base station may transmit, to the UE, the uplink precoding matrix indicator and a downlink reference signal. The operations of 2010 may be performed according to the methods described herein. In some examples, aspects of the operations of 2010 may be performed by a precoding manager as described with reference to FIGS. 10 through 13.

At 2015, the base station may receive, from the UE, a channel state information report responsive to the uplink precoding matrix indicator and the downlink reference signal, where the channel state information report is based on a self-interference estimate of concurrent uplink and downlink transmissions according to the uplink precoding matrix indicator and on measurements of the downlink reference signal. The operations of 2015 may be performed according to the methods described herein. In some examples, aspects of the operations of 2015 may be performed by a CSI manager as described with reference to FIGS. 10 through 13.

At 2020, the base station may determine a downlink transport format for the one or more downlink transmissions to be concurrently transmitted with the one or more uplink transmissions, based on the channel state information report. The operations of 2020 may be performed according to the methods described herein. In some examples, aspects of the operations of 2020 may be performed by a resource grant manager as described with reference to FIGS. 10 through 13.

Optionally, at 2025, the base station may transmit, to the UE, downlink grant information and uplink grant information for downlink communications and uplink communications that at least partially overlap in time and frequency, where the downlink grant information indicates the downlink transport format. The operations of 2025 may be performed according to the methods described herein. In some examples, aspects of the operations of 2025 may be performed by a resource grant manager as described with reference to FIGS. 10 through 13.

Optionally, at 2030, the base station may communicate with the UE in a full-duplex mode with concurrent uplink and downlink communications that at least partially overlap in frequency based on the downlink grant information and the uplink grant information. The operations of 2030 may be performed according to the methods described herein. In some examples, aspects of the operations of 2030 may be performed by a resource grant manager as described with reference to FIGS. 10 through 13.

Figure 21:
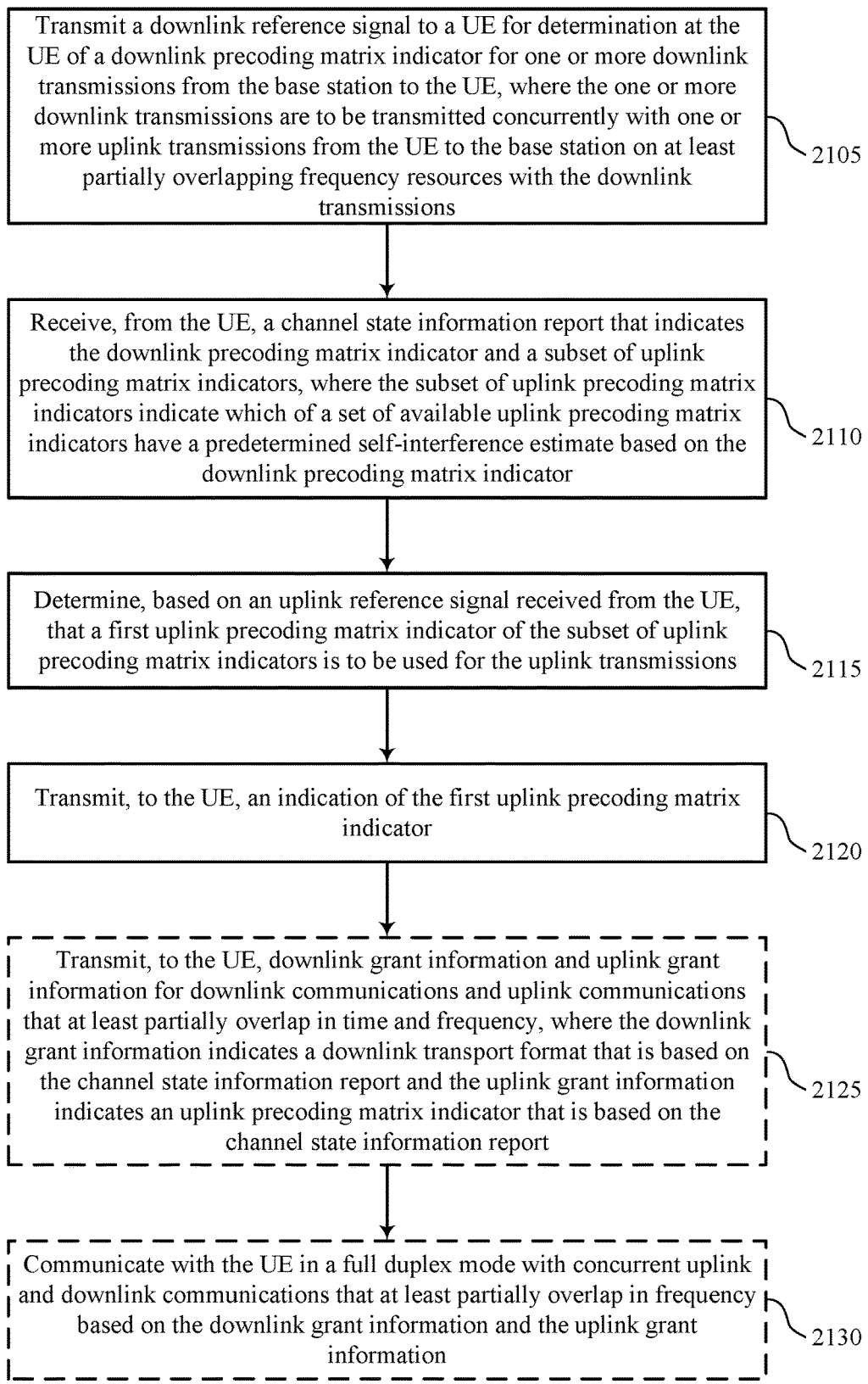

FIG. 21 shows a flowchart illustrating a method 2100 that supports channel state information reporting techniques for full-duplex user equipment in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. The operations of 2105 may be performed according to the methods described herein. In some examples, aspects of the operations of 2105 may be performed by a precoding manager as described with reference to FIGS. 10 through 13.

At 2110, the base station may receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator. The operations of 2110 may be performed according to the methods described herein. In some examples, aspects of the operations of 2110 may be performed by a CSI manager as described with reference to FIGS. 10 through 13.

At 2115, the base station may determine, based on an uplink reference signal received from the UE, that a first uplink precoding matrix indicator of the subset of uplink precoding matrix indicators is to be used for the uplink transmissions. The operations of 2115 may be performed according to the methods described herein. In some examples, aspects of the operations of 2115 may be performed by a precoding manager as described with reference to FIGS. 10 through 13.

At 2120, the base station may transmit, to the UE, an indication of the first uplink precoding matrix indicator. The operations of 2120 may be performed according to the methods described herein. In some examples, aspects of the operations of 2120 may be performed by a resource grant manager as described with reference to FIGS. 10 through 13.

Optionally, at 2125, the base station may transmit, to the UE, downlink grant information and uplink grant information for downlink communications and uplink communications that at least partially overlap in time and frequency, where the downlink grant information indicates a downlink transport format that is based on the channel state information report and the uplink grant information indicates an uplink precoding matrix indicator that is based on the channel state information report. The operations of 2125 may be performed according to the methods described herein. In some examples, aspects of the operations of 2125 may be performed by a resource grant manager as described with reference to FIGS. 10 through 13.

Optionally, at 2130, the base station may communicate with the UE in a full-duplex mode with concurrent uplink and downlink communications that at least partially overlap in frequency based on the downlink grant information and the uplink grant information. The operations of 2130 may be performed according to the methods described herein. In some examples, aspects of the operations of 2130 may be performed by a resource grant manager as described with reference to FIGS. 10 through 13.

Figure 22:
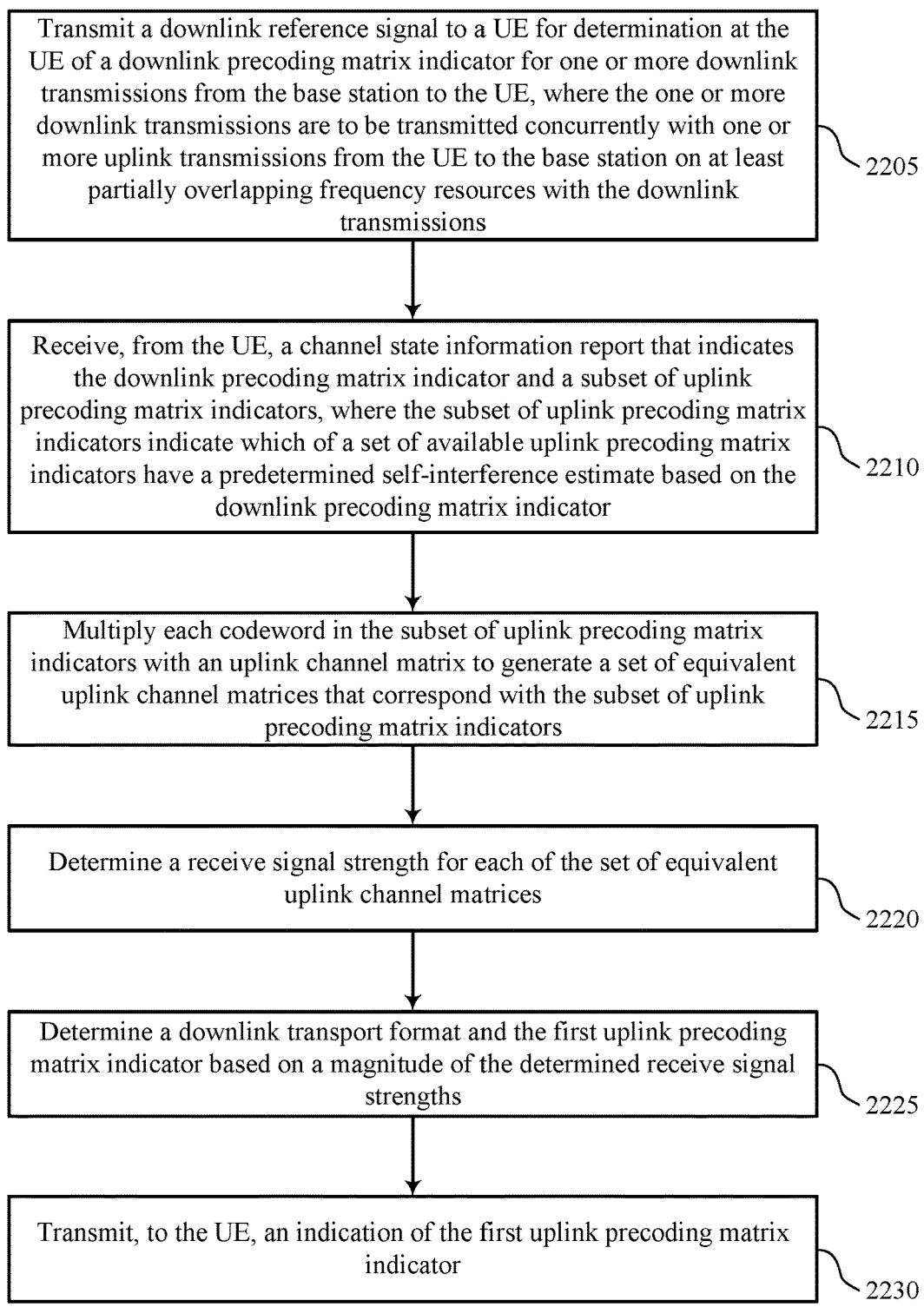

FIG. 22 shows a flowchart illustrating a method 2200 that supports channel state information reporting techniques for full-duplex user equipment in accordance with aspects of the present disclosure. The operations of method 2200 may be implemented by a base station 105 or its components as described herein. For example, the operations of method 2200 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2205, the base station may transmit a downlink reference signal to a UE for determination at the UE of a downlink precoding matrix indicator for one or more downlink transmissions from the base station to the UE, where the one or more downlink transmissions are to be transmitted concurrently with one or more uplink transmissions from the UE to the base station on at least partially overlapping frequency resources with the downlink transmissions. The operations of 2205 may be performed according to the methods described herein. In some examples, aspects of the operations of 2205 may be performed by a precoding manager as described with reference to FIGS. 10 through 13.

At 2210, the base station may receive, from the UE, a channel state information report that indicates the downlink precoding matrix indicator and a subset of uplink precoding matrix indicators, where the subset of uplink precoding matrix indicators indicate which of a set of available uplink precoding matrix indicators have a predetermined self-interference estimate based on the downlink precoding matrix indicator. The operations of 2210 may be performed according to the methods described herein. In some examples, aspects of the operations of 2210 may be performed by a CSI manager as described with reference to FIGS. 10 through 13.

At 2215, the base station may multiply each codeword in the subset of uplink precoding matrix indicators with an uplink channel matrix to generate a set of equivalent uplink channel matrices that correspond with the subset of uplink precoding matrix indicators. The operations of 2215 may be performed according to the methods described herein. In some examples, aspects of the operations of 2215 may be performed by a CSI manager as described with reference to FIGS. 10 through 13.

At 2220, the base station may determine a receive signal strength for each of the set of equivalent uplink channel matrices. The operations of 2220 may be performed according to the methods described herein. In some examples, aspects of the operations of 2220 may be performed by a CSI manager as described with reference to FIGS. 10 through 13.

At 2225, the base station may determine a downlink transport format and the first uplink precoding matrix indicator based on a magnitude of the determined receive signal strengths. The operations of 2225 may be performed according to the methods described herein. In some examples, aspects of the operations of 2225 may be performed by a precoding manager as described with reference to FIGS. 10 through 13. In some cases, the first uplink precoding matrix indicator is determined based on one or more of a highest received signal strength, an indicated signal strength of the downlink reference signal at the UE that is provided in the channel state information report, or any combinations thereof. In some cases, the subset of uplink precoding matrix indicators correspond to a preferable or unpreferable subset of the set of available uplink precoding matrix indicators, and where the base station excludes the unpreferable subset of uplink precoding matrix indicators from the set of available uplink precoding matrix indicators when determining the first uplink precoding matrix indicator.

At 2230, the base station may transmit, to the UE, an indication of the first uplink precoding matrix indicator. The operations of 2230 may be performed according to the methods described herein. In some examples, aspects of the operations of 2230 may be performed by a resource grant manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, an uplink precoding matrix indicator for uplink transmissions of the UE, wherein one or more of the uplink transmissions are to be transmitted concurrently with one or more downlink transmissions that are to be received at the UE on frequency resources that at least partially overlap with frequency resources for the uplink transmissions;
   determining, based at least in part on the uplink precoding matrix indicator and measurements of a downlink reference signal received from the base station, a channel state information report that is based at least in part on a self-interference estimate of concurrent uplink and downlink transmissions according to the uplink precoding matrix indicator and on the measurements of the downlink reference signal; and
   transmitting the channel state information report to the base station.

2. The method of claim 1, further comprising:
   receiving, from the base station, downlink grant information and uplink grant information for downlink communications and uplink communications that at least partially overlap in time and frequency, wherein the downlink grant information indicates a downlink transport format that is based at least in part on the channel state information report; and
   communicating with the base station in a full-duplex mode with concurrent uplink and downlink communications that at least partially overlap in frequency based at least in part on the downlink grant information and the uplink grant information.

3. The method of claim 1, further comprising:
   transmitting at least one of a non-precoded or a precoded uplink reference signal to the base station, and wherein the uplink precoding matrix indicator corresponds to a precoding matrix applied to the precoded uplink reference signal.

4. The method of claim 3, wherein the transmitting the precoded uplink reference signal comprises:
   transmitting a plurality of precoded uplink reference signals using a plurality of different reference signal resources, wherein each reference signal resource is associated with a different uplink precoding matrix, wherein the uplink precoding matrix indicator from the base station identifies a selected reference signal resource, and wherein the downlink reference signal is a channel state information reference signal (CSI-RS) and the uplink reference signal is a sounding reference signal (SRS).

5. The method of claim 1, wherein:
the uplink precoding matrix indicator from the base station identifies an index of an uplink precoding matrix that belongs to a set of preconfigured uplink precoding matrixes, or
the uplink precoding matrix indicator from the base station includes a plurality of uplink precoding matrix indicator values.

6. The method of claim 1, wherein the uplink precoding matrix indicator is provided in a channel state information report configuration.

7. The method of claim 6, wherein the channel state information report configuration is an aperiodic channel state information report configuration provided in a medium access control (MAC) control element or downlink control information.

8. The method of claim 1, wherein the determining the channel state information report comprises:
measuring a downlink channel status of a first set of receive antennas for the downlink reference signal to generate a downlink signal matrix;
adding the self-interference estimate to the downlink signal matrix to determine a full-duplex mode downlink signal matrix; and
generating the channel state information report based at least in part on the full-duplex mode downlink signal matrix.

9. The method of claim 8, wherein the adding the self-interference estimate comprises:
identifying a self-interference based at least in part on the first set of receive antennas, a second set of transmit antennas, and the uplink precoding matrix indicator;
mitigating the self-interference over the downlink signal matrix based at least in part on the identified self-interference; and
determining a full-duplex mode downlink signal matrix based at least in part on the mitigated self-interference.

10. The method of claim 9, wherein the mitigating the self-interference comprises:
calculating a self-interference matrix based at least in part on the first set of receive antennas, the second set of transmit antennas, and the uplink precoding matrix indicator; and
projecting the downlink signal matrix into a null subspace of the self-interference matrix or whitening a composite interference-plus-noise matrix that corresponds to an added self-interference matrix and the downlink signal matrix.

11. A method for wireless communications at a user equipment (UE), comprising:
determining, based at least in part on one or more measurements of a downlink reference signal received from a base station, a downlink precoding matrix indicator for one or more downlink transmissions from the base station to the UE, wherein the one or more downlink transmissions are to be transmitted concurrently with one or more uplink transmissions from the UE to the base station on at least partially overlapping frequency resources with the downlink transmissions;
selecting, based at least in part on the downlink precoding matrix indicator, a subset of uplink precoding matrix indicators from a set of available uplink precoding matrix indicators, wherein the subset of uplink precoding matrix indicators are selected based at least in part on a self-interference estimate of the concurrent uplink and downlink transmissions associated with each uplink precoding matrix indicator of the subset of uplink precoding matrix indicators;
transmitting, to the base station, a channel state information report indicating at least the downlink precoding matrix indicator and the subset of uplink precoding matrix indicators; and
receiving, from the base station, an indication of which of the subset of uplink precoding matrix indicators are to be used for the uplink transmissions.

12. The method of claim 11, wherein the uplink precoding matrix indicator from the base station identifies an index of an uplink precoding matrix that belongs to a set of preconfigured uplink precoding matrixes.

13. The method of claim 11, further comprising:
transmitting at least one of a non-precoded or a precoded uplink reference signal to the base station, and wherein the uplink precoding matrix indicator corresponds to a precoding matrix applied to the uplink reference signal.

14. The method of claim 11, wherein the subset of uplink precoding matrix indicators correspond to a preferable or unpreferable subset of the set of available uplink precoding matrix indicators based at least in part on the one or more measurements of the downlink reference signal and the determined downlink precoding matrix indicator.

15. The method of claim 11, wherein the subset of uplink precoding matrix indicators include a plurality of pairs of self-interference estimate values and precoding matrix indicators and wherein, for each pair in the plurality of pairs, the self-interference estimate value corresponds to the associated precoding matrix indicator value.

16. The method of claim 15, wherein one uplink precoding matrix indicator value is linked with each pair of the plurality of pairs and different pairs of the plurality of pairs do not use a same precoding matrix indicator value.

17. The method of claim 15, wherein the set of uplink precoding matrix indicators is sorted according respective self-interference estimates, and the subset of uplink precoding matrix indicators includes uplink precoding matrix indicators having self-interference estimates that are below a threshold value or includes a configured number of uplink precoding matrix indicators that have the lowest self-interference estimates.

18. The method of claim 15, wherein each pair of the plurality of pairs of self-interference estimate values and precoding matrix indicators is transmitted in a separate channel state information report.

19. The method of claim 15, wherein each pair of the plurality of pairs of self-interference estimate values and precoding matrix indicators is indicated in a single channel state information report that includes an indication of each precoding matrix indication and associated self-interference value that is quantized in a differential manner relative to a first reported self-interference value.

20. The method of claim 11, further comprising:
receiving, from the base station, downlink grant information and uplink grant information for downlink communications and uplink communications that at least partially overlap in time and frequency, wherein the downlink grant information indicates a downlink transport format that is based at least in part on the channel state information report and the uplink grant information indicates an uplink precoding matrix indicator that is based at least in part on the channel state information report; and communicating with the base station in a full-duplex mode with concurrent uplink and downlink communications that at least partially overlap in frequency based at least in part on the downlink grant information and the uplink grant information.

21. The method of claim 11, wherein the selecting comprises:
measuring a downlink channel status of a first set of receive antennas for the downlink reference signal to generate a downlink signal matrix;
estimating a first self-interference matrix based at least in part on a first uplink precoding matrix indicator that is associated with a second set of transmit antennas;
determining that a channel quality associated with the downlink signal matrix and the first self-interference matrix exceeds a threshold value; and
determining one or more equivalent self-interference matrices to the first self-interference matrix, and wherein the subset of uplink precoding matrix indicators are associated with the one or more equivalent self-interference matrices.

22. The method of claim 11, wherein the subset of uplink precoding matrix indicators are provided in a codepoint or a bitmap, wherein the channel state information report further includes one or more of a rank indicator or a channel quality indicator, and wherein the channel state information report is a periodic, semi-persistent or aperiodic report.

23. An apparatus for wireless communications at a user equipment (UE), comprising:
a processor,
memory coupled with the processor, and
instructions stored in the memory and executable by the processor to cause the apparatus to:
receive, from a base station, an uplink precoding matrix indicator for uplink transmissions of the UE, wherein one or more of the uplink transmissions are to be transmitted concurrently with one or more downlink transmissions that are to be received at the UE on frequency resources that at least partially overlap with frequency resources for the uplink transmissions;
determine, based at least in part on the uplink precoding matrix indicator and measurements of a downlink reference signal received from the base station, a channel state information report that is based at least in part on a self-interference estimate of concurrent uplink and downlink transmissions according to the uplink precoding matrix indicator and on the measurements of the downlink reference signal; and
transmit the channel state information report to the base station.

24. The apparatus of claim 23, wherein the instructions are further executable by the processor to cause the apparatus to:
receive, from the base station, downlink grant information and uplink grant information for downlink communications and uplink communications that at least partially overlap in time and frequency, wherein the downlink grant information indicates a downlink transport format that is based at least in part on the channel state information report; and
communicate with the base station in a full-duplex mode with concurrent uplink and downlink communications that at least partially overlap in frequency based at least in part on the downlink grant information and the uplink grant information.

25. The apparatus of claim 23, wherein the instructions are further executable by the processor to cause the apparatus to:
transmit a precoded uplink reference signal to the base station, and wherein the uplink precoding matrix indicator corresponds to a precoding matrix applied to the precoded uplink reference signal.

26. An apparatus for wireless communications at a user equipment (UE), comprising:
a processor,
memory coupled with the processor; and
instructions stored in the memory and executable by the processor to cause the apparatus to:
determine, based at least in part on one or more measurements of a downlink reference signal received from a base station, a downlink precoding matrix indicator for one or more downlink transmissions from the base station to the UE, wherein the one or more downlink transmissions are to be transmitted concurrently with one or more uplink transmissions from the UE to the base station on at least partially overlapping frequency resources with the downlink transmissions;
select, based at least in part on the downlink precoding matrix indicator, a subset of uplink precoding matrix indicators from a set of available uplink precoding matrix indicators, wherein the subset of uplink precoding matrix indicators are selected based at least in part on a self-interference estimate of the concurrent uplink and downlink transmissions associated with each uplink precoding matrix indicator of the subset of uplink precoding matrix indicators;
transmit, to the base station, a channel state information report indicating at least the downlink precoding matrix indicator and the subset of uplink precoding matrix indicators; and
receive, from the base station, an indication of which of the subset of uplink precoding matrix indicators are to be used for the uplink transmissions.

27. The apparatus of claim 26, wherein the uplink precoding matrix indicator from the base station identifies an index of an uplink precoding matrix that belongs to a set of preconfigured uplink precoding matrixes.

28. The apparatus of claim 26, wherein the instructions are further executable by the processor to cause the apparatus to:
transmit a precoded uplink reference signal to the base station, and wherein the uplink precoding matrix indicator corresponds to a precoding matrix applied to the uplink reference signal.

29. The apparatus of claim 26, wherein the subset of uplink precoding matrix indicators correspond to a preferable or unpreferable subset of the set of available uplink precoding matrix indicators based at least in part on the one or more measurements of the downlink reference signal and the determined downlink precoding matrix indicator.

30. The apparatus of claim 26, wherein the instructions are further executable by the processor to cause the apparatus to:
receive, from the base station, downlink grant information and uplink grant information for downlink communications and uplink communications that at least partially overlap in time and frequency, wherein the downlink grant information indicates a downlink transport format that is based at least in part on the channel state information report and the uplink grant information indicates an uplink precoding matrix indicator that is based at least in part on the channel state information report; and
communicate with the base station in a full-duplex mode with concurrent uplink and downlink communications that at least partially overlap in frequency based at least in part on the downlink grant information and the uplink grant information.

* * * * *